(12) United States Patent
Myers et al.

(10) Patent No.: US 11,637,748 B2
(45) Date of Patent: Apr. 25, 2023

(54) SELF-OPTIMIZATION OF COMPUTING ENVIRONMENTS

(71) Applicant: MicroStrategy Incorporated, Vienna, VA (US)

(72) Inventors: Clayton Myers, Oak Hill, VA (US); Andrew Smith, Oakton, VA (US); Richard Gardner, Leesburg, VA (US)

(73) Assignee: MicroStrategy Incorporated, Vienna, VA (US)

(*) Notice: Subject to any disclaimer, the term of this patent is extended or adjusted under 35 U.S.C. 154(b) by 0 days.

(21) Appl. No.: 17/005,657

(22) Filed: Aug. 28, 2020

(65) Prior Publication Data
US 2021/0067406 A1   Mar. 4, 2021

Related U.S. Application Data

(60) Provisional application No. 62/892,671, filed on Aug. 28, 2019.

(51) Int. Cl.
| | |
|---|---|
| *H04L 41/082* | (2022.01) |
| *G06F 11/34* | (2006.01) |
| *G06F 11/30* | (2006.01) |
| *G06F 9/50* | (2006.01) |
| *H04L 41/0823* | (2022.01) |

(52) U.S. Cl.
CPC ............ *H04L 41/082* (2013.01); *G06F 9/505* (2013.01); *G06F 9/5077* (2013.01); *G06F 11/3006* (2013.01); *G06F 11/3409* (2013.01); *H04L 41/0823* (2013.01); *G06F 2209/508* (2013.01)

(58) Field of Classification Search
CPC ............... H04L 41/082; H04L 41/0813; H04L 41/0823; H04L 41/0853; H04L 41/5009; H04L 12/24; H04L 45/02; H04L 43/08; G06F 9/46; G06F 9/50; G06F 9/455; G06F 9/505; G06F 9/5077; G06F 11/30; G06F 11/34; G06F 11/1484; G06F 11/3006;
(Continued)

(56) References Cited

U.S. PATENT DOCUMENTS

| | | | |
|---|---|---|---|
| 5,758,071 A | 5/1998 | Burgess et al. | |
| 6,085,244 A | 7/2000 | Wookey | |

(Continued)

OTHER PUBLICATIONS

U.S. Office Action in U.S. Appl. No. 16/582,874, dated May 19, 2021, 23 pages.
(Continued)

*Primary Examiner* — James N Fiorillo
(74) *Attorney, Agent, or Firm* — Fish & Richardson P.C.

(57) ABSTRACT

Methods, systems, and apparatus, including computer programs encoded on a computer storage medium, for self-optimization of computing environments. In some implementations, different combinations of settings used by one or more server environments are determined. Results achieved by the one or more server environments are monitored when using the different combinations of settings. Based on the monitored results, one or more performance measures are generated that correspond to each of the different combinations of settings. An updated set of settings are selected for a particular server environment based on the performance measures. The selected settings are provided for the particular server environment.

19 Claims, 4 Drawing Sheets

(58) Field of Classification Search
CPC ............. G06F 11/3409; G06F 11/3466; G06F 2209/508; G06F 2201/81; G06F 2201/815
USPC ........................................................ 709/221
See application file for complete search history.

(56) References Cited

U.S. PATENT DOCUMENTS

| | | |
|---|---|---|
| 6,282,175 B1 | 8/2001 | Steele et al. |
| 6,334,158 B1 | 12/2001 | Jennyc et al. |
| 6,338,149 B1 | 1/2002 | Ciccone, Jr. et al. |
| 6,339,795 B1 | 1/2002 | Narukar et al. |
| 6,449,739 B1 | 9/2002 | Landan |
| 6,473,794 B1 | 10/2002 | Guheen et al. |
| 6,691,067 B1 | 2/2004 | Ding et al. |
| 6,691,245 B1 | 2/2004 | DeKoning |
| 6,792,393 B1 * | 9/2004 | Farel ................... G06F 11/0706 702/186 |
| 6,816,871 B2 | 11/2004 | Lee |
| 6,934,934 B1 | 8/2005 | Baker et al. |
| 6,964,051 B1 | 11/2005 | Palaniappan |
| 6,993,747 B1 | 1/2006 | Friedman |
| 7,024,548 B1 | 4/2006 | O'Toole, Jr. |
| 7,035,919 B1 | 4/2006 | Eismann et al. |
| 7,047,177 B1 | 5/2006 | Eismann et al. |
| 7,051,098 B2 | 5/2006 | Masters et al. |
| 7,089,347 B2 | 8/2006 | Mogi et al. |
| 7,155,462 B1 | 12/2006 | Singh et al. |
| 7,197,559 B2 | 3/2007 | Goldstein et al. |
| 7,346,676 B1 | 3/2008 | Swildens et al. |
| 7,389,216 B2 | 6/2008 | Parent et al. |
| 7,523,447 B1 | 4/2009 | Callahan et al. |
| 7,552,438 B1 | 6/2009 | Werme et al. |
| 7,581,011 B2 | 8/2009 | Teng |
| 7,617,486 B2 | 11/2009 | Sharma et al. |
| 7,657,871 B2 | 2/2010 | Velupillai |
| 7,784,049 B1 | 8/2010 | Gandler |
| 7,802,174 B2 | 9/2010 | Teng et al. |
| 7,917,617 B1 | 3/2011 | Ponnapur et al. |
| 7,937,655 B2 | 5/2011 | Teng et al. |
| 7,996,525 B2 | 8/2011 | Stienhans et al. |
| 8,024,299 B2 | 9/2011 | Dias et al. |
| 8,099,727 B2 | 1/2012 | Bahat et al. |
| 8,219,432 B1 | 7/2012 | Bradley et al. |
| 8,260,893 B1 | 9/2012 | Bandhole et al. |
| 8,285,681 B2 | 10/2012 | Prahlad et al. |
| 8,554,918 B1 | 10/2013 | Douglis |
| 8,583,769 B1 | 11/2013 | Peters et al. |
| 8,595,364 B2 | 11/2013 | Levy et al. |
| 8,595,714 B1 | 11/2013 | Hamer et al. |
| 8,612,599 B2 | 12/2013 | Tung et al. |
| 8,732,604 B2 | 5/2014 | Okamoto et al. |
| 8,805,970 B2 | 8/2014 | Breh et al. |
| 8,819,171 B2 | 8/2014 | Chakraborty et al. |
| 8,892,954 B1 | 11/2014 | Gray et al. |
| 8,903,995 B1 | 12/2014 | Basak et al. |
| 8,990,778 B1 | 3/2015 | Allocca et al. |
| 9,047,017 B1 | 6/2015 | Dolan et al. |
| 9,053,220 B2 | 6/2015 | Banks et al. |
| 9,110,496 B1 | 8/2015 | Michelsen |
| 9,164,874 B1 | 10/2015 | Tonnay et al. |
| 9,166,895 B1 | 10/2015 | Sivaraman |
| 9,189,294 B2 | 11/2015 | Considine et al. |
| 9,262,150 B2 | 2/2016 | Haserodt et al. |
| 9,268,663 B1 | 2/2016 | Siddiqui et al. |
| 9,270,449 B1 | 2/2016 | Tribble et al. |
| 9,311,161 B2 | 4/2016 | Jagtap |
| 9,367,305 B1 | 6/2016 | Kumar et al. |
| 9,424,172 B1 | 8/2016 | Helder |
| 9,436,535 B2 | 9/2016 | Ricken et al. |
| 9,491,072 B2 | 11/2016 | Raghunathan et al. |
| 9,531,604 B2 | 12/2016 | Akolkar et al. |
| 9,674,294 B1 | 6/2017 | Gonthier et al. |
| 9,716,624 B2 | 7/2017 | Zeyliger et al. |
| 9,733,921 B1 | 8/2017 | Saenz et al. |
| 9,762,450 B2 | 9/2017 | Xie |
| 9,766,962 B2 | 9/2017 | Dvir et al. |
| 9,767,312 B2 | 9/2017 | Sahoo et al. |
| 9,811,849 B2 | 11/2017 | Bursey |
| 9,820,224 B2 | 11/2017 | Hui et al. |
| 9,928,210 B1 | 3/2018 | Zhang et al. |
| 9,959,104 B2 | 5/2018 | Chen et al. |
| 9,965,261 B2 | 5/2018 | Chen et al. |
| 9,986,427 B2 | 5/2018 | Kimpe |
| 10,002,247 B2 | 6/2018 | Suarez et al. |
| 10,007,509 B1 | 6/2018 | Quershi et al. |
| 10,169,023 B2 | 1/2019 | Ciano et al. |
| 10,191,778 B1 | 1/2019 | Yang et al. |
| 10,241,778 B2 | 3/2019 | Emeis et al. |
| 10,244,034 B2 | 3/2019 | Joshi et al. |
| 10,261,782 B2 | 4/2019 | Suarez et al. |
| 10,303,455 B2 | 5/2019 | Fitzgerald et al. |
| 10,310,949 B1 | 6/2019 | Chakraborty et al. |
| 10,318,280 B2 | 6/2019 | Islam et al. |
| 10,356,214 B2 | 7/2019 | Joshi et al. |
| 10,389,582 B1 | 8/2019 | Fakhouri et al. |
| 10,440,153 B1 | 10/2019 | Smith et al. |
| 10,452,440 B1 * | 10/2019 | Odulinski ............... G06F 9/485 |
| 10,474,548 B2 | 11/2019 | Sanakkayala et al. |
| 10,803,411 B1 | 10/2020 | Smith et al. |
| 10,810,041 B1 | 10/2020 | Myers et al. |
| 10,853,111 B1 | 12/2020 | Gupta et al. |
| 10,997,052 B2 * | 5/2021 | Khosrowpour ..... G06F 11/3476 |
| 10,997,135 B2 | 5/2021 | Zoll et al. |
| 11,102,330 B2 | 8/2021 | Gardner et al. |
| 11,102,331 B2 | 8/2021 | Smith et al. |
| 11,210,189 B2 | 12/2021 | Myers et al. |
| 11,283,900 B2 | 3/2022 | Myers et al. |
| 11,354,216 B2 | 6/2022 | Gardner et al. |
| 11,360,881 B2 | 6/2022 | Gardner et al. |
| 11,438,231 B2 | 9/2022 | Gardner et al. |
| 2002/0065833 A1 | 5/2002 | Litvin |
| 2002/0122422 A1 | 9/2002 | Kenney et al. |
| 2002/0124243 A1 | 9/2002 | Broeksteeg et al. |
| 2002/0157090 A1 | 10/2002 | Patel et al. |
| 2002/0198985 A1 | 12/2002 | Fraenkel et al. |
| 2003/0037283 A1 * | 2/2003 | Srinivasan ................ H04L 1/22 714/11 |
| 2003/0135382 A1 | 7/2003 | Marejka et al. |
| 2004/0060044 A1 | 3/2004 | Das et al. |
| 2004/0068424 A1 | 4/2004 | Lee et al. |
| 2006/0059253 A1 | 3/2006 | Goodman et al. |
| 2006/0129870 A1 | 6/2006 | Parent et al. |
| 2006/0236056 A1 | 10/2006 | Nagata |
| 2007/0226304 A1 | 9/2007 | Virk et al. |
| 2008/0077366 A1 | 3/2008 | Neuse et al. |
| 2008/0097960 A1 | 4/2008 | Dias et al. |
| 2008/0109448 A1 | 5/2008 | Aboel-Nil et al. |
| 2008/0115195 A1 | 5/2008 | Malek et al. |
| 2008/0163092 A1 | 7/2008 | Rao |
| 2008/0243660 A1 | 10/2008 | Amemiya et al. |
| 2008/0247314 A1 | 10/2008 | Kim et al. |
| 2008/0301663 A1 | 12/2008 | Bahat et al. |
| 2009/0018996 A1 | 1/2009 | Hunt et al. |
| 2009/0063699 A1 | 3/2009 | Chapweske et al. |
| 2009/0070462 A1 | 3/2009 | Saenz et al. |
| 2009/0282401 A1 | 11/2009 | Todorova |
| 2010/0115049 A1 | 5/2010 | Matsunaga et al. |
| 2010/0153780 A1 | 6/2010 | Kirtkow |
| 2010/0162406 A1 | 6/2010 | Benameur et al. |
| 2010/0250487 A1 | 9/2010 | Gabriel et al. |
| 2010/0318986 A1 | 12/2010 | Burke et al. |
| 2011/0054968 A1 | 3/2011 | Galaviz |
| 2011/0055823 A1 | 3/2011 | Nichols et al. |
| 2011/0099290 A1 | 4/2011 | Swildens et al. |
| 2011/0145525 A1 | 6/2011 | Browne et al. |
| 2011/0314344 A1 | 12/2011 | Okamoto et al. |
| 2012/0096149 A1 | 4/2012 | Sunkara et al. |
| 2012/0117620 A1 | 5/2012 | Cassidy |
| 2012/0167094 A1 | 6/2012 | Suit |
| 2012/0198279 A1 | 8/2012 | Schroeder |
| 2012/0246638 A1 | 9/2012 | He et al. |
| 2012/0310765 A1 | 12/2012 | Masters |
| 2013/0042123 A1 | 2/2013 | Smith et al. |
| 2013/0054792 A1 | 2/2013 | Sharaf |

(56) References Cited

U.S. PATENT DOCUMENTS

| | | |
|---|---|---|
| 2013/0080514 A1 | 3/2013 | Gupta et al. |
| 2013/0197863 A1 | 8/2013 | Rayate et al. |
| 2013/0297769 A1 | 11/2013 | Chang et al. |
| 2013/0311740 A1 | 11/2013 | Watanabe et al. |
| 2013/0339299 A1 | 12/2013 | Muller et al. |
| 2014/0019387 A1 | 1/2014 | Cao et al. |
| 2014/0020048 A1 | 1/2014 | Snodgrass |
| 2014/0089033 A1 | 3/2014 | Snodgrass |
| 2014/0089505 A1 | 3/2014 | Haserodt et al. |
| 2014/0156839 A1 | 6/2014 | Swildens et al. |
| 2014/0165063 A1 | 6/2014 | Shiva et al. |
| 2014/0201735 A1* | 7/2014 | Kannan ................. G06F 9/5077 718/1 |
| 2014/0282456 A1 | 9/2014 | Drost et al. |
| 2014/0331209 A1 | 11/2014 | Singh |
| 2014/0331225 A1 | 11/2014 | Helander et al. |
| 2014/0358944 A1 | 12/2014 | Brower, Jr. et al. |
| 2015/0019195 A1 | 1/2015 | Davis |
| 2015/0019197 A1 | 1/2015 | Higginson |
| 2015/0019488 A1 | 1/2015 | Balch et al. |
| 2015/0019706 A1 | 1/2015 | Raghunathan et al. |
| 2015/0081574 A1 | 3/2015 | Selby et al. |
| 2015/0089479 A1 | 3/2015 | Chen et al. |
| 2015/0095892 A1 | 4/2015 | Baggott et al. |
| 2015/0100829 A1 | 4/2015 | Nanjundappa et al. |
| 2015/0143364 A1 | 5/2015 | Anderson et al. |
| 2015/0154934 A1* | 6/2015 | Spitzer ................... G09G 5/003 345/618 |
| 2015/0160885 A1 | 6/2015 | Hara et al. |
| 2015/0178052 A1 | 6/2015 | Gupta et al. |
| 2015/0220426 A1 | 8/2015 | Spektor et al. |
| 2015/0242636 A1 | 8/2015 | Khan et al. |
| 2015/0295792 A1 | 10/2015 | Cropper et al. |
| 2015/0326432 A1 | 11/2015 | Fujie et al. |
| 2015/0331715 A1 | 11/2015 | Sathyanarayana |
| 2015/0373097 A1 | 12/2015 | Konkus et al. |
| 2016/0026555 A1 | 1/2016 | Kuo et al. |
| 2016/0044040 A1 | 2/2016 | Caffary, Jr. |
| 2016/0055067 A1 | 2/2016 | Bensinger |
| 2016/0072730 A1 | 3/2016 | Jurban et al. |
| 2016/0132320 A1 | 5/2016 | Fitzgerald et al. |
| 2016/0139887 A1 | 5/2016 | Pudiyapura et al. |
| 2016/0164738 A1 | 6/2016 | Pinski et al. |
| 2016/0277249 A1 | 9/2016 | Singh et al. |
| 2016/0335106 A1 | 11/2016 | Behere et al. |
| 2016/0335108 A1 | 11/2016 | Ryu et al. |
| 2016/0337186 A1 | 11/2016 | Dolinsky et al. |
| 2016/0344610 A1 | 11/2016 | Robinette |
| 2016/0350205 A1 | 12/2016 | Acharya et al. |
| 2016/0371170 A1 | 12/2016 | Salunke et al. |
| 2017/0034023 A1* | 2/2017 | Nickolov ............ H04L 43/0817 |
| 2017/0041201 A1* | 2/2017 | Ilyadis ................ H04L 41/5045 |
| 2017/0061313 A1* | 3/2017 | Oros ................... G06F 11/3409 |
| 2017/0090972 A1 | 3/2017 | Ryu et al. |
| 2017/0147319 A1 | 5/2017 | Riek et al. |
| 2017/0154017 A1 | 6/2017 | Kristiansson et al. |
| 2017/0177860 A1 | 6/2017 | Suarez et al. |
| 2017/0185488 A1 | 6/2017 | Kumarasamy et al. |
| 2017/0270455 A1 | 9/2017 | Chi et al. |
| 2017/0295199 A1 | 10/2017 | Kirti et al. |
| 2017/0300311 A1 | 10/2017 | Lopez et al. |
| 2017/0315795 A1 | 11/2017 | Keller |
| 2018/0013616 A1 | 1/2018 | Abadi et al. |
| 2018/0075086 A1 | 3/2018 | Yam et al. |
| 2018/0088926 A1 | 3/2018 | Abrams |
| 2018/0088935 A1 | 3/2018 | Church et al. |
| 2018/0095778 A1 | 4/2018 | Aydelott et al. |
| 2018/0095973 A1 | 4/2018 | Huang et al. |
| 2018/0136931 A1 | 5/2018 | Hendrich et al. |
| 2018/0157516 A1 | 6/2018 | Kristiansson et al. |
| 2018/0173502 A1 | 6/2018 | Biskup et al. |
| 2018/0173522 A1 | 6/2018 | Hamill et al. |
| 2018/0205652 A1 | 7/2018 | Saxena |
| 2018/0267908 A1 | 9/2018 | Pan et al. |
| 2018/0285199 A1 | 10/2018 | Mitkar et al. |
| 2018/0285210 A1 | 10/2018 | Mitkar et al. |
| 2018/0285246 A1 | 10/2018 | Turtle et al. |
| 2018/0285353 A1 | 10/2018 | Rao et al. |
| 2018/0287696 A1 | 10/2018 | Barbieri et al. |
| 2018/0287902 A1 | 10/2018 | Chitalia et al. |
| 2018/0288129 A1 | 10/2018 | Joshi et al. |
| 2018/0341471 A1 | 11/2018 | Stefanov et al. |
| 2019/0034313 A1 | 1/2019 | Vedurumudi et al. |
| 2019/0050680 A1 | 2/2019 | Waugh et al. |
| 2019/0095254 A1 | 3/2019 | Rao |
| 2019/0102204 A1* | 4/2019 | Khosrowpour ..... G06F 11/3409 |
| 2019/0109822 A1 | 4/2019 | Clark et al. |
| 2019/0109857 A1 | 4/2019 | Caffary, Jr. |
| 2019/0132329 A1 | 5/2019 | Verberkt et al. |
| 2019/0163559 A1 | 5/2019 | Takahashi et al. |
| 2019/0208031 A1 | 7/2019 | Bennet et al. |
| 2019/0213068 A1 | 7/2019 | Upadhyay |
| 2019/0230130 A1 | 7/2019 | Beckman et al. |
| 2019/0235897 A1 | 8/2019 | Goel |
| 2019/0236844 A1 | 8/2019 | Balasian et al. |
| 2019/0260716 A1 | 8/2019 | Lerner |
| 2019/0278669 A1 | 9/2019 | Mueller-Wicke et al. |
| 2019/0288956 A1 | 9/2019 | Pulier et al. |
| 2019/0303541 A1 | 10/2019 | Reddy et al. |
| 2019/0312800 A1* | 10/2019 | Schibler ............... H04L 41/0823 |
| 2019/0317829 A1 | 10/2019 | Brown et al. |
| 2019/0342425 A1* | 11/2019 | Cheng ................. H04L 41/0895 |
| 2019/0354389 A1 | 11/2019 | Du et al. |
| 2019/0392045 A1 | 12/2019 | De Lima Junior et al. |
| 2020/0019393 A1 | 1/2020 | Vichare et al. |
| 2020/0067763 A1 | 2/2020 | Vytla |
| 2020/0081814 A1 | 3/2020 | Srinivasan et al. |
| 2020/0099773 A1 | 3/2020 | Myers et al. |
| 2020/0112624 A1 | 4/2020 | Smith et al. |
| 2020/0119979 A1 | 4/2020 | Woodland et al. |
| 2020/0135264 A1* | 4/2020 | Brady .................... G06F 3/0679 |
| 2020/0177634 A1 | 6/2020 | Hwang et al. |
| 2020/0204465 A1 | 6/2020 | Baker et al. |
| 2020/0249962 A1* | 8/2020 | Vichare ................. G06F 9/5083 |
| 2020/0257612 A1 | 8/2020 | Lang et al. |
| 2020/0272786 A1 | 8/2020 | Pandurangarao et al. |
| 2020/0293436 A1 | 9/2020 | Carames et al. |
| 2020/0356806 A1 | 11/2020 | Li et al. |
| 2020/0366572 A1 | 11/2020 | Chauhan |
| 2020/0394120 A1 | 12/2020 | Salmi et al. |
| 2021/0019321 A1* | 1/2021 | Ehrlich ............ G06F 16/24553 |
| 2021/0042141 A1 | 2/2021 | De Marco et al. |
| 2021/0048995 A1 | 2/2021 | Myers et al. |
| 2021/0048998 A1 | 2/2021 | Myers et al. |
| 2021/0049002 A1 | 2/2021 | Myers et al. |
| 2021/0064262 A1 | 3/2021 | Myers et al. |
| 2021/0064492 A1 | 3/2021 | Myers et al. |
| 2021/0065078 A1 | 3/2021 | Gardner et al. |
| 2021/0067607 A1 | 3/2021 | Gardner et al. |
| 2021/0073026 A1 | 3/2021 | Myers et al. |
| 2021/0081298 A1 | 3/2021 | Gardner et al. |
| 2021/0089438 A1 | 3/2021 | Gardner et al. |
| 2021/0092015 A1 | 3/2021 | Gardner et al. |
| 2021/0124610 A1 | 4/2021 | Gardner et al. |
| 2022/0046111 A1 | 2/2022 | Smith et al. |
| 2022/0171687 A1 | 6/2022 | Myers et al. |
| 2022/0300407 A1 | 9/2022 | Gardner et al. |

OTHER PUBLICATIONS

U.S. Office Action in U.S. Appl. No. 16/582,874, dated Nov. 13, 2020, 21 pages.

U.S. Office Action in U.S. Appl. No. 16/556,636, dated Jun. 8, 2021, 7 pages.

U.S. Office Action in U.S. Appl. No. 16/582,874, dated Sep. 16, 2021, 30 pages.

doc-archives.microstrategy.com [online], "Installation and Configuration Guide," Sep. 2018, retrieved Mar. 20, 2020, retrieved from URL <https://doc-archives.microstrategy.com/producthelp/10.11/manuals/en/InstallationConfig.pdf>, 527 pages.

www2.microstrategy.com [online], "OperationsManager Guide" 2016, retrieved on Mar. 20, 2020 retrieved from URL <https://www2.

(56) References Cited

OTHER PUBLICATIONS microstrategy.com/producthelp/10.4/manuals/en/OperationsManager.pdf>, 154 pages.
Abhors et al., "An Automated Approach for Creating Workload Models from Server Log Data," 9th Intl Conf. on Software Engineering and Applications, 2014, 1-12.
Doc-archives.microstrategy.com [online], "Installing and Configuring MicroStrategy Library," Jun. 2017, retrieved on Oct. 25, 2019, retrieved from URL <https://doc-archives.microstrategy.com/producthelp/10.10/InstallConfig/WebHelp/Lang_1033/Content/install_config_library.htm>, 2 pages.
docs.docker.com [online], "Get Started, Part 1: Orientation and setup," 2017, retrieved on Oct. 25, 2019, retrieved from URL<https://docs.docker.com/get-started/>, 6 pages.
Dyn.com "Kubernetes: The Difference Between Containers and Virtual Machines," Feb. 2018, retrieved on Oct. 25, 2019, retrieved from URL <https://dyn.com/blog/kubernetes-the-difference-between-containers-and-virtual-machines/>, 8 pages.
Edureka.co [online], "Docker tutorial—Introduction to docker & containerization," 2017, retrieved on Oct. 25, 2019, retrieved from URL <https://www.edureka.co/blog/docker-tutorial>, 10 pages.
GWS Advisory [online], "What's New in Microstrategy 2019", Jan. 2019, retrieved on Oct. 8, 2021, retrieved from URL < https://www.gwsadvisory.com/wp-content/uploads/2019/01/whats-new-in-microstrategy-2019.pdf >, 138 pages.
Kubernetes.io [online], "Concepts underlying the cloud controller manager," May 2019, retrieved on Jun. 20, 2019, retrieved from URL <https://kubernetes.io/docs/concepts/architecture/cloud-controller/>, 9 pages.
Kubernetes.io [online], "StatefulSet is the workload API object used to manage stateful applications," Jun. 2019, retrieved on Jun. 20, 2019, retrieved from URL <https://kubernetes.io/docs/concepts/workloads/controllers/statefulset/>, 9 pages.
Linkedin.com [online], "Moving MicroStrategy to a docker/kubernetes infrastructure," Jan. 2018, retrieved from Oct. 25, 2019 retrieved from URL <https://www.linkedin.com/pulse/moving-microstrategy-dockerkubernetes-infrastructure-montero/>, 3 pages.
linuxize.com [online], "How To Remove Docker Containers, Images, Volumes, and Networks," Oct. 2018, retrieved on Oct. 25, 2019, retrieved from URL <https://linuxize.com/post/how-to-remove-docker-images-containers-volumes-and-networks/#remove-one-or-more-containers>, 11 pages.
Ma et al., "Efficient service handoff across edge setvers via docker container migration author:," 2017, SEC '17: Proceedings of the Second ACM/IEEE Symposium on Edge Computing, 11:1-13.
MicroStrategy [online], "MicroStrategy 10.9 Readme", 2017, retrieved on Oct. 5, 2021, 124 pages.
MicroStrategy [online], "System Administration Guide", 2018, retrieved on Oct. 5, 2021, 831 pages.
MicroStrategy [online], "Tools to Upgrade with Confidence", Feb. 4, 2019, retrieved on Oct. 12, 2021, 26 pages.
MicroStrategy [online], "Upgrade Guide—Upgrading your MicroStrategy Enterprise Software", Jun. 2016, retrieved on Oct. 8, 2021, retrieved from URL <https://doc-archives.microstrategy.com/producthelp/10.4/manuals/en/UpgradeGuide.pdf >, 109 pages.
MicroStrategy [online], "Upgrade Guide—Version 10", 2015, retrieved on Oct. 8, 2021, retrieved from URL <https://doc-archives.microstrategy.com/producthelp/10/manuals/en/UpgradeGuide.pdf>, 118 pages.
MicroStrategy [online], "Upgrade Guide—Version 10. 9", Sep. 2017, retrieved on Oct. 8, 2021, retrieved from URL <https://www2.microstrategy.com/producthelp/10.9/manuals/en/UpgradeGuide.pdf>, 90 pages.
MicroStrategy [online], "Upgrade Guide—Version 10.11", Jun. 2018, retrieved on Oct. 8, 2021, retrieved from URL < https://www2.microstrategy.com/producthelp/10.11/manuals/en/UpgradeGuide.pdf >, 92 pages.
MicroStrategy.com [online], "Microstrategy on Kubernetes," 2017, retrieved on Oct. 25, 2019, retrieved from URL <https://www.microstrategy.com/getmedia/d99b44dc-ec44-451b-a5a3-3db7160282f0/Genesys-How-to-run-MicroStrategy-on-Kubernetes>, 10 pages.
Pederson, "Testing SharePoint Apps in Production (Canary Release)", Simon J.K. Pedersen's Azure & Docker blog, 2014, pp. 1-9.
Singh et al., "Container-based microservice architecture for cloud applications," May 2017, 2017 International Conference on Computing, Communication and Automation (ICCCA), pp. 847-852.
Stackoverflow.com [online] "What's the difference between ClusterIP, NodePort and LoadBalancer service types in Kubernetes?" Jan. 2017, retrieved from URL <https://stackoverflow.com/questions/41509439/whats-the-difference-between-clusterip-nodeport-and-loadbalancer-service-types/52241241#52241241>, 6 pages.
Tao et al., "Dynamic Resource Allocation Algorithm for Container-based Service Computing"; 2017 IEEE 13th International Symposium on Autonomous Decentralized Systems—2017 IEEE, pp. 62-67.
Tuton, "Deploy A MongoDB replica set using the IBM Cloud Kubernetes Service," IBM Developer, Mar. 15, 2018, 14 pages.
U.S. Office Action in U.S. Appl. No. 16/542,023, dated Oct. 22, 2021, 9 pages.
U.S. Office Action in U.S. Appl. No. 16/542,023, dated Mar. 12, 2021, 15 pages.
U.S. Office Action in U.S. Appl. No. 16/557,713, dated Aug. 5, 2021, 39 pages.
U.S. Office Action in U.S. Appl. No. 16/557,713, dated Feb. 24, 2021, 34 pages.
U.S. Office Action in U.S. Appl. No. 16/557,713, dated Nov. 13, 2020, 25 pages.
Wikipedia.org [online], "Docker(software)," Mar. 2013, retrieved on Oct. 25, 2019, retrieved from URL <https://en.wikipedia.org/wiki/Docker_(software)>, 8 pages.
Wikipedia.org [online], "OS-level virtualization," Aug. 2006, retrieved on Oct. 25, 2019, retrieved from URL <https://en.wikipedia.org/wiki/OS-level_virtualization> , 4 pages.
Wikipedia [online], "System Image," Feb. 2013, retrieved Oct. 25, 2019, retrieved from URL <https://en.wikipedia.org/wiki/System_image>, 2 pages.
Wong, "What's the Difference Between Containers and Virtual Machines?," Jul. 15, 2016, Electronic Design, retrieved from URL <http://electronicdesign.com/ dev-tools /what-s-difference-between-containers-and-virtualmachines>, 3 pages.
www.en.wikipedia.org [online], "Online Analytical Processing" Mar. 2018, retrieved on Mar. 19, 2020, retrieved from URL <https://en.wikipedia.org/wiki/Online_analytical_processing>, 14 pages.
www2.microstrategy.com [online], "MicroStrategy Intelligence Server," Apr. 2019, retrieved on Oct. 25, 2019, retrieved from URL https://www2.microstrategy.com/producthelp/10.4/ProjectDesignGuide/WebHelp/Lang_1033/Content/ProjectDesign/MicroStrategy_Intelligence_Server.htm, 2 pages.
Xu et al.;"Mining Container Image Repositories for Software Configuration and Beyond"; 2018 ACM/IEEE 40th International Conference on Software Engineering: New Ideas and Emerging Results—ICSE-NIER'18, May 27-Jun. 3, 2018, 6 pages.
Office Action in U.S. Appl. No. 16/557,482, dated Nov. 30, 2020, 13 pages.
Office Action in U.S. Appl. No. 16/582,874, dated Mar. 25, 2022, 26 pages.
Office Action in U.S. Appl. No. 16/787,596, dated Nov. 25, 2020, 11 pages.
Office Action in U.S. Appl. No. 17/028,565, dated Mar. 2, 2022, 8 pages.
Ancillaryinsights[online], "MicroStrategy Analytics Enterprise—Upgrade Guide", 2013, retrieved on Sep. 29, 2021, retrieved from URL <http://ancillaryinsights.com/producthelp/AnalyticsEnterprise/manuals/en/UpgradeGuide.pdf> , 122 pages.
Bedford-computing [online], "JMeter Tutorial", retrieved on Sep. 29, 2021, retrieved from URL < http://bedford-computing.co.uk/learning/wp-content/uploads/2016/03/JMeter-Tutorial.pdf> , 53 pages.
HP [online], "An Introduction to HP LoadRunner software" May 2011, retrieved on Sep. 29, 2021, retrieved from URL <https://www.hp.com/sg-en/pdf/LR_technical_WP_tcm_196_1006601.pdf>, 8 pages.

(56) References Cited

OTHER PUBLICATIONS

Jaspersoft [online], "Performance Testing with Jmeter," 2012, retrieved on Sep. 29, 2021, retrieved from URL <https://community.jaspersoft.com/wiki/performance-testing-jmeter>, 4 pages.

Microfocus [online], "LoadRunner and Performance Center," Feb. 2018, retrieved on Sep. 29, 2021, retrieved from URL <https://www.microfocus.com/media/documentation/loadrunner_and_performance_center_document.pdf >, 249 pages.

MicroStrategy [online], "Configuring an upgrade test environment," 2019, retrieved on Sep. 29, 2021, retrieved from URL <https://doc-archives.microstrategy.com/producthelp/11.0/UpgradeGuide/WebHelp/Lang_1033/Content/configuring_an_upgrade_test_environment.htm>, 2 pages.

MicroStrategy [online], "High-level steps to configure an upgrade test environment," 2019, retrieved on Sep. 29, 2021, retrieved from URL <https://doc-archives.microstrategy.com/producthelp/11.0/UpgradeGuide/WebHelp/Lang_1033/content/high_level_steps_to_configure_an_upgrade_test_envi.htm >, 2 pages.

MicroStrategy [online], "Integrity Manager—Upgrade Impact Testing," 2019, retrieved on Sep. 29, 2021, retrieved from URL <https://www2.microstrategy.com/producthelp/2019/UpgradeGuide/en-us/Content/Integrity_testing.htm>, 2 pages.

MicroStrategy [online], "Integrity Manager Homepage," 2019, retrieved on Sep. 29, 2021, retrieved from URL <https://community.microstrategy.com/s/article/Integrity-Manager-Homepage?language=en_US>, 2 pages.

MicroStrategy [online], "KB16749: What is MicroStrategy Integrity Manager?", 2019, retrieved on Sep. 29, 2021, retrieved from URL <https://community.microstrategy.com/s/article/KB16749-What-is-MicroStrategy-Integrity-Manager?language=en_US >, 2 pages.

MicroStrategy [online], "MicroStrategy Capacity Testing Tool," 2019, retrieved on Sep. 29, 2021, retrieved from URL<https://www2.microstrategy.com/producthelp/2019/UpgradeGuide/en-us/Content/capacity_testing.htm>, 2 pages.

MicroStrategy [online], "MicroStrategy Integrity Manager" 2017, retrieved on Sep. 29, 2021, retrieved from URL <https://doc-archives.microstrategy.com/producthelp/10.4/ProjectDesignGuide/WebHelp/Lang_1033/Content/ProjectDesign/MicroStrategy_Integrity_Manager.htm>, 2 pages.

MicroStrategy [online], "MicroStrategy Upgrade Best Practices" Aug. 2019, retrieved on Sep. 29, 2021, retrieved from URL <https://community.microstrategy.com/s/article/MicroStrategy-Upgrade-Best-Practices?language=en_US>, 2 pages.

MicroStrategy [online], "Perform Basic Stability Testing," 2019, retrieved on Sep. 29, 2021, retrieved from URL <https://doc-archives.microstrategy.com/producthelp/11.0/UpgradeGuide/WebHelp/Lang_1033/Content/perform_basic_stability_testing_on_the_test_server.htm>, 2 pages.

MicroStrategy [online], "The Upgrade Process Checklist," 2019, retrieved on Sep. 29, 2021, retrieved from URL <https://doc-archives.microstrategy.com/producthelp/11.0/UpgradeGuide/WebHelp/Lang_1033/Content/the_upgrade_process_checklist.htm> , 3 pages.

MicroStrategy [online], "Upgrade Analysis Dossier," 2020, retrieved on Sep. 29, 2021, retrieved from URL <https://community.microstrategy.com/s/article/Upgrade-Analysis-Dossier?language=en_US>, 2 pages.

Notice of Allowance in U.S. Appl. No. 16/582,874, dated Jun. 2, 2022, 9 pages.

Notice of Allowance in U.S. Appl. No. 17/555,765, dated Sep. 14, 2022, 9 pages.

Office Action in U.S. Appl. No. 17/406,196, dated Sep. 16, 2022, 14 pages.

Tutorialspoint [online], "JMETER—Quick Guide," 2007, retrieved on Sep. 29, 2021, retrieved from URL <https://www.tutorialspoint.com/jmeter/pdf/jmeter_quick_guide.pdf>, 49 pages.

* cited by examiner

SELF-OPTIMIZATION OF COMPUTING ENVIRONMENTS

CROSS-REFERENCE TO RELATED APPLICATION

This application claims the benefit of U.S. Provisional Application No. 62/892,671, filed Aug. 28, 2019, and titled "SELF-OPTIMIZATION OF COMPUTING ENVIRONMENTS," which is incorporated by reference.

TECHNICAL FIELD

This disclosure generally relates to computing optimization.

BACKGROUND

Modifications to the settings of a server environment can impact the environment's performance, sometimes in unanticipated ways. Server environments are typically modified through manual input. Attempts to optimize a server environment's performance are frequently time-consuming tasks.

SUMMARY

In some implementations, a computer system can perform self-optimization procedures to improve the performance and capabilities of computing environments. For example, the computer system can collect performance metrics for computing environments that use different combinations of settings. This can include determining the relative performance metrics for different environments, where the relative metrics normalize for differences in hardware resources and load levels. The relative metrics can highlight the contribution of software settings (e.g., memory allocations, cache allocations and limits, network settings, concurrency settings, software versions, etc.). Based on the performance metrics and other information, the computer system can identify the combinations of settings that provide the best performance for different workloads and different situations. The computer system can then use the identified combinations of settings to automatically reconfigure computer environments to achieve improved performance.

In general, the settings for a server can impact performance differently depending on the type of load and level of load experienced by the server. The combination of settings that provides the best performance (e.g., according to one or more criteria such as highest power efficiency, maximum throughput, greatest capacity, shortest response time, etc.) will often vary with changes in usage. Accordingly, the computer system can adapt to changes in usage of a server with automatic changes to the server's settings. In addition, even when a server's workload remains consistent, evaluation of other combinations of settings, whether actually run by other servers or when simulated, can reveal areas where different settings can provide improvement.

A management system can monitor performance of one or more server environments and record the settings, hardware resources, and load conditions corresponding to the performance measurements. This can include monitoring actual performance of server environments when responding to actual user traffic. In addition, the management system can create test environments and monitor their performance with different combinations of server settings, hardware resources, and load conditions. These test environments can simulate other combinations of settings to determine the impact of changes without disruption to production systems in use. The results of performance monitoring, for both actually deployed environments and test environments, can be used to determine the combinations of settings that provide the best performance for different workloads and hardware configurations. This information can be determined at various different levels, for example, for individual environments, for multiple environments across an organization, or across environments of different organizations.

Once the management system has characterized the expected performance of different settings with different workloads and other conditions, the management system can initiate changes in server environments to improve performance. These changes can be made periodically, for example, once per day. Changes to settings can also be made incrementally or gradually, so that they are successively adjusted toward a target level over multiple different cycles of settings updates.

In general, the management system can evolve and adapt the settings for different computing environments individually, on an ongoing basis. Different environments experience different workloads and so may be configured with different settings. Other factors may also affect the individual adaptation of settings for an environment. For example, the criteria or objectives for different environments may be different. Some may prioritize user capacity over response time and some may prioritize the opposite. Similarly, some systems may place different limits or targets on different performance measures. The management system can store and use these individualized criteria to customize the sets of settings that are instructed for different environments. In addition, the management system can monitor the usage of each individual computing environment's workload, and detect patterns and shifts in that workload. In response, the management server can select and provide new combinations of settings that improve performance, given the adjusted workload characteristics, for the performance areas that matter for that environment. Changes to settings can be made in response to certain conditions or triggers being detected, or based on evaluation at certain intervals (e.g., hourly, daily, weekly, etc.).

In one general aspect, a method is performed by one or more computers. The method includes: determining, by the one or more computers, different combinations of settings used by one or more server environments; monitoring, by the one or more computers, results achieved by the one or more server environments when using the different combinations of settings; based on the monitored results, generating, by the one or more computers, one or more performance measures corresponding to each of the different combinations of settings; selecting, by the one or more computers, an updated set of settings for a particular server environment based on the performance measures; and providing, by the one or more computers, the selected settings for the particular server environment.

Implementations may include one or more of the following features. For example, in some implementations, determining different combinations of settings used by one or more server environments includes obtaining, from each of multiple server environments, the combination of settings used by the server environment.

In some implementations, the method further includes obtaining, from each of the multiple server environments, data indicating hardware resources used and/or load levels present when the results are monitored. In these implementations, generating the one or more performance measures corresponding to each of the different combinations of settings includes generating relative performance measures that are at least partially normalized to account for differences among the multiple server environments in hardware resources used and/or load levels present when the results are monitored.

In some implementations, selecting the updated set of settings for the particular server environment includes: ranking the different combinations of settings based on the performance measures corresponding to each of the different combinations of settings; selecting one of the combinations of settings as the updated set of settings for the particular server environment based on the ranking.

In some implementations, the one or more server environments include multiple server environments, and where the method further includes: determining hardware resources allocated to the respective server environments when results are monitored; determining load levels present at the respective server environments when the results are monitored. In these implementations, generating the one or more performance measures corresponding to each of the different combinations of settings includes generating, for each combination of settings, a relative performance measure that is based on (i) monitored results for a server environment using the combination of settings, (ii) the hardware resources allocated, and (iii) the load level present.

In some implementations, monitoring, by the one or more computers, results achieved by the one or more server environments when using the different combinations of settings includes: initiating, by the one or more computers, a set of tasks for each of the one or more server environments; and monitoring, for each of the one or more server environments, a completion time for each task in the set of tasks.

In some implementations, providing the selected settings for the particular server environment includes initiating a change for the particular server environment to use the selected settings.

In some implementations, providing the selected settings for the particular server environment includes providing the selected settings.

In some implementations, the method further includes adjusting each of the settings of the multiple environments based on the one or more performance measures.

In some implementations, the method includes periodically changing the settings for the particular server environment on an ongoing basis as addition performance measures are generated.

In some implementations, the method includes making a series of multiple incremental changes to a configuration setting of the particular server environment, each of the incremental changes moving the configuration setting closer to a corresponding setting in the selected settings.

In some implementations, monitoring results achieved by the one or more server environments when using the different combinations of settings includes repeatedly performing a predetermined set of tasks and monitoring completion times for the set of tasks.

In some implementations, monitoring results achieved by the one or more server environments when using the different combinations of settings includes: generating a copy of one of the server environments, the copy being hosted by different hardware resources; and changing the combinations of settings of the copy of the server environment and monitoring performance of the copy of the server environment when using each of the different combinations of settings when performing a predetermined set of tasks.

In some implementations, the settings include one or more of caching settings, concurrency settings, or memory allocation settings.

In some implementations, monitoring results achieved include monitoring completion times for generating or serving each of a predetermined set of multiple documents.

In some implementations, monitoring results achieved include monitoring speed of processing tests configured to appear to the server environment as user requests.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
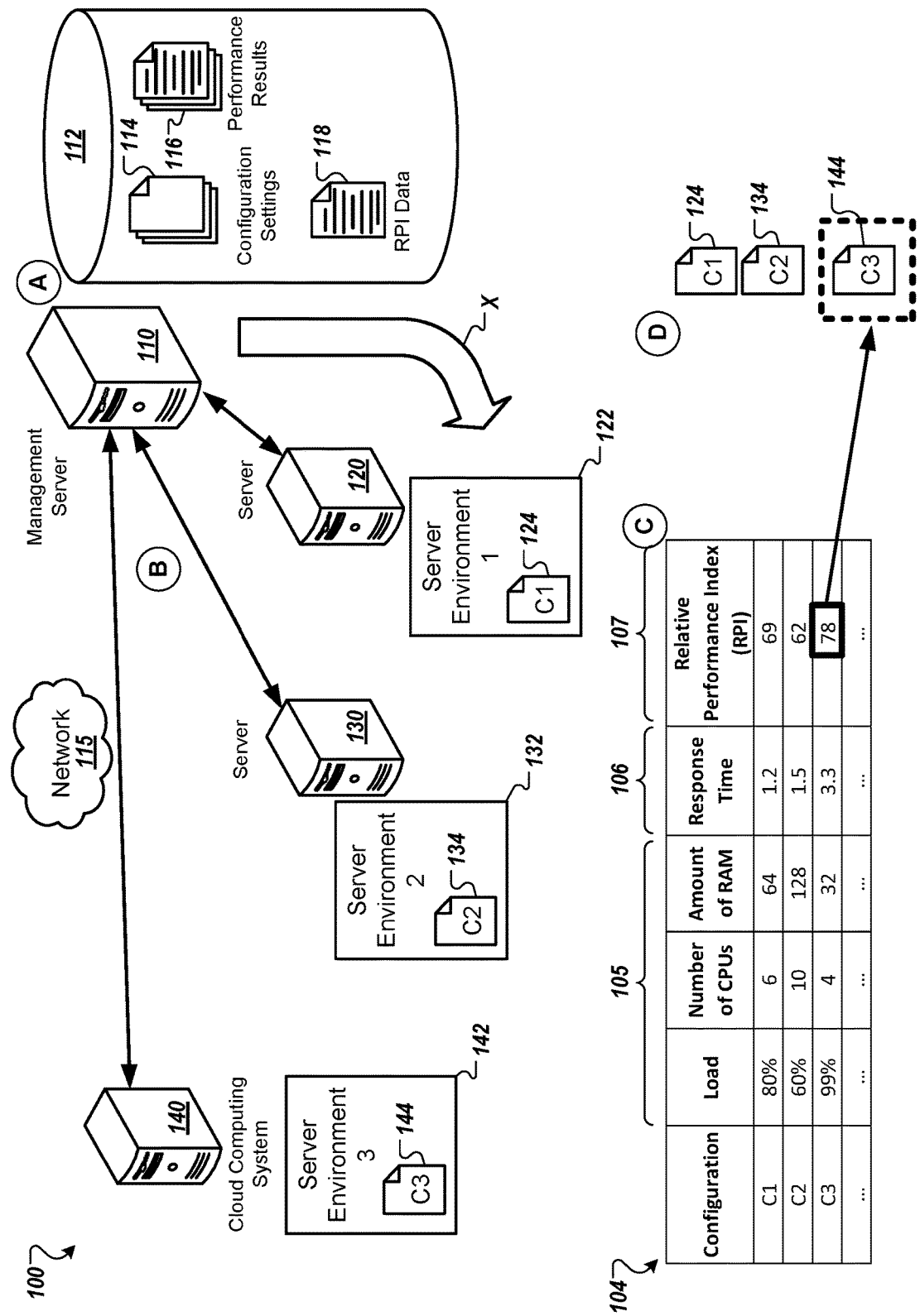
FIGS. 1A-1B are diagrams that illustrates an example system for optimizing computing environments.
Figure 1B:
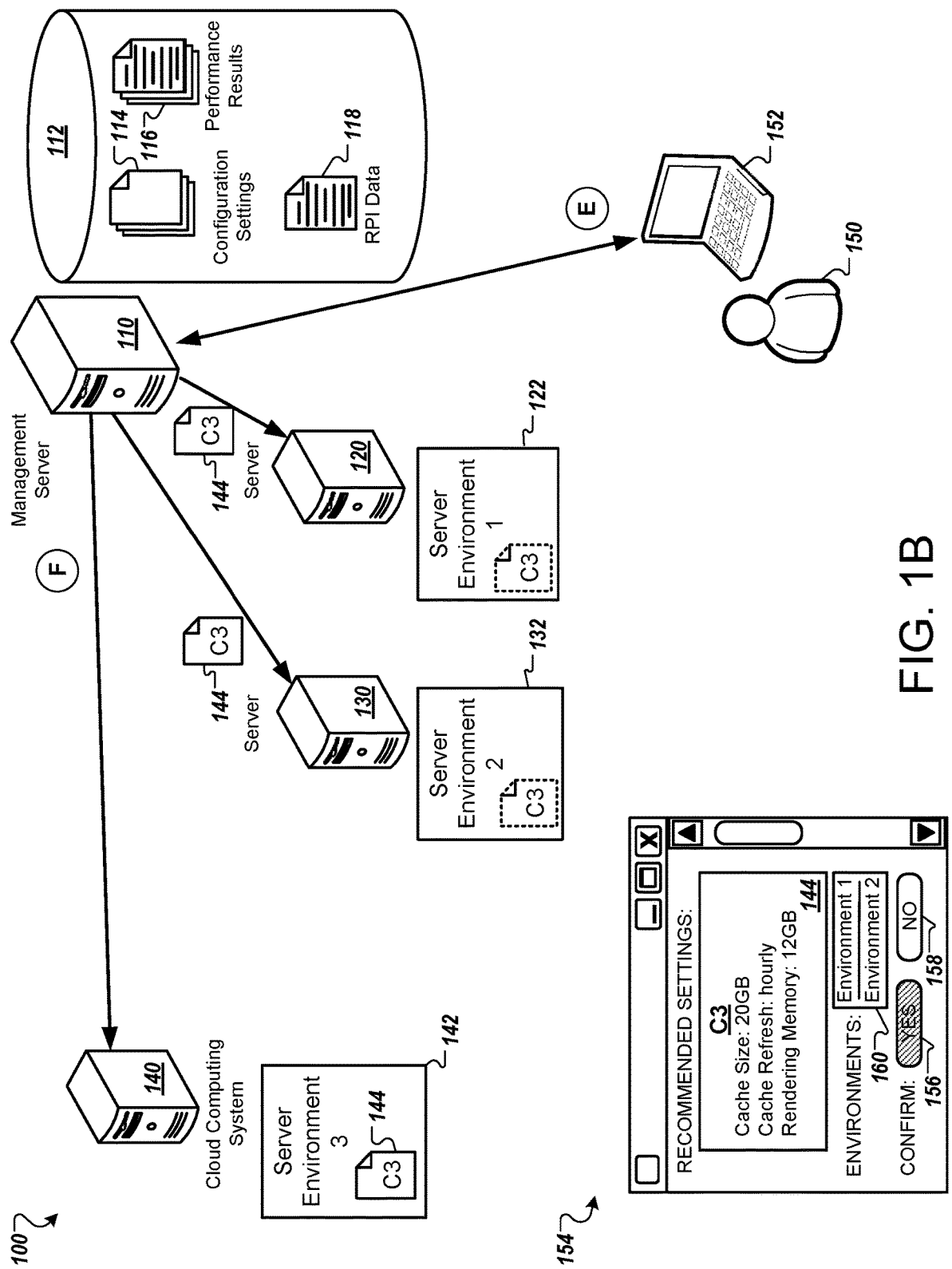

FIGS. 1A-1B are diagrams that illustrates an example system 100 for optimizing computing environments. The system 100 includes a management server 110, a first server 120 have a first server environment 122, a second server 130 having a second server environment 132, and a cloud computing system 140 having a third server environment 142. Although the example of FIGS. 1A-1B emphasizes the ability to optimize server environments, the same techniques can be used to optimize settings or operation of other environments, such as mobile devices, desktop computers, laptop computers, wearable devices, etc. as well as systems of multiple devices. FIGS. 1A-1B also illustrate a flow of data, shown as stages (A) to (G), which can represent steps in an example process. Stages (A) to (G) may occur in the illustrated sequence, or in a sequence that is different from the illustrated sequence. For example, some of the stages may occur concurrently.

In general, a server environment refers to software that provides server functionality over a network and/or a combination of hardware and software that provides server functionality. For example, a server environment may be a particular server, e.g., an on-premises server. As another example, a server environment may be a virtual machine for a server, a containerized server (e.g., made up of one or more one or more application containers), etc. Server environments can be virtualized, especially when hosted using third-party cloud computing infrastructure. A server environment may represent a single function or application (e.g., a web server, a database server, a file server, an application server, etc.) or may represent the software (e.g., modules, containers, virtual machines, etc.) for a combination of multiple functions. In a similar manner, while a computing environment or computer environment represent a single physical computer, including its hardware and software, the computing environment may be a software environment and there does not need to be a 1-to-1 mapping. For example, a cluster of computers together may provide a computing environment, and a single computer may provide multiple computing environments. As another example, a cloud computing system can host many different computing environments as virtual machines, containerized implementations, and other forms.

A computing environment or server environment can include the combination of one or more of the operating system, applications, processes, interfaces, network connections, data source connections, files and data sets, and so on, each of which may affect how the environment processes data and interacts with users and other systems. A computing environment or server environment can include the hardware resources assigned, including one or more of the processors, memory, storage devices, and other hardware. Nevertheless, given the extensive use of virtualization and cloud computing hosting, an environment typically not tied to a specific set of hardware and in many cases may be moved or replicated on different hardware (e.g., from one server to another server, from a local server to a cloud computing system, etc.).

The system 100 can perform performance testing of multiple server environments 122, 132, and 142 to determine performance metrics, such as a relative performance index (RPI) discussed below, for the respective configuration settings of the server environments 122, 132, and 142. The system 100 can use the determined performance metrics to select new settings for the server environments and to implement those settings.

The management server 110 can include one or more computers. The management server 110 can communicate with the other servers and/or server environments over a network.

The management server 110 has data storage 112 containing the configuration settings 114 for each of the server environments 122, 132, and 142. In some implementations, the configuration settings 114 contain multiple sets of configuration settings for each environment, including past configuration settings to show the combinations of settings that were active at different times.

The data storage 112 also includes performance results 116 for each server environment 122, 132, and 142. In some implementations, the performance results 116 include performance results for different combinations of settings and at different times. For example, historical performance results for different time periods can be stored.

The data storage 112 also includes RPI data 118 containing the RPIs that the management server 110 calculates. In some implementations, the RPI data 118 contains an RPI for each of the combinations of settings stored in the configuration settings 114. As the management server 110 receives a new set of performance results 116, the management server 110 determines the RPI represented by those results and stores the resulting RPI in association with the set of configuration settings 114 used when that RPI was achieved. The management server 110 can build the repository of performance data over time for many sets of historical configuration settings 114 and their corresponding RPIs.

The data storage 112 can store other information about the server environments 122, 132, and 142, such as their load levels over time, the types of workloads experienced, data indicating their hardware resources, and so on.

The first server 120 can include one or more computers and can communicate with the management server 110 over a network. The first server 120 manages/hosts the first server environment 122.

The second server 130 can include one or more computers and can communicate with the management server 110 over a network. The second server 130 manages/hosts the second server environment 132.

The cloud computing system 140 can include one or more computers and can communicate with the management server 110 over a network. The cloud computing system 140 may be remote, e.g., it may be provided by a third party. The cloud computing system 140 may be part of a cloud computing platform (e.g., Amazon Web Services (AWS), Microsoft Azure, etc.). The cloud computing system 140 manages and/or hosts the third server environment 142. The third server environment 142 can be a virtual, cloud-based environment. This type of virtual environment may be implemented as a guest, an instance, a container, or an emulation. The third server environment 142 may be provided using, for example, a virtual machine model, paravirtual machine model, or through OS-level virtualization.

The first server 120, the second server 130, and/or the cloud computing system 140 communicate with the management server 110 over a network 115, which can include public and/or private networks and can include the Internet.

The techniques disclosed in this document can adaptively improve the performance of computing environments while reducing or eliminating the need for manual configuration changes. For example, when testing of different configurations for a server reveals that a new configuration provides improved performance, the new configuration can be implemented and the process can continue to test further refined sets of configuration settings for the server. In addition, the configuration of one server can be adjusted and optimized based on the testing and results achieved for other servers. The system can normalize test results for different servers to account for the differences in hardware capabilities and workloads of the different servers, and then use the normalized results to identify the configurations that provide the best results (e.g., high efficiency, capacity, response time, etc.). The configuration settings that provide high performance can then be distributed and applied to many different servers, including servers operated by different third parties or organizations.

As discussed further below, the settings for a server environment by providing a method to quickly determine the best configuration settings from a group of configuration settings tested. The disclosed system determines the best configuration settings by calculating a relative performance index (RPI) for each of the tested combinations of configuration settings. The RPI is a normalized performance value that normalizes results to account for differences in hardware and load. The RPI thus attempts to provide a measure that is independent (or nearly independent) of the individual characteristics of a particular server environment.

For example, a first server environment experiencing high load with limited hardware resources may take longer to complete a task than a second server environment with light load and more hardware resources would require to perform the same task. However, the combination of settings used by the first server environment may actually use the limited resources more efficiently than the settings for the second server environment. The RPI measures can account for this difference and provide a higher score to the first server environment, even though the absolute measures of results (e.g., task completion time) may be lower. In this manner, the combinations of configuration settings for the server environments with the highest RPIs can be determined to represent the most efficient or highest-performing combinations of settings. For example, having determined that the first server environment has a higher RPI than the second server environment, the management server 110 can adjust the settings of the second server environment to be more like those of the first server environment, and thereby further improve the performance of the second server environment.

With the RPIs, the management server 110 can identify the best sets of configuration settings among many server environments and many permutations of combinations of configuration settings. The management server can then implement those combinations of configuration settings for other server environments to improve their performance.

As shown in FIG. 1A, in stage (A), the management server 110 determines configuration settings to be applied for different server environments 122, 132, 142. To start, the management server 110 can use the current settings of the server environments 122, 132, 142 and test performance with those settings to establish a baseline level of performance. The management server 110 may periodically make changes to the configuration settings of different servers and re-test the performance. For example, the management server may generate variations of the current set of settings of the servers, and apply the changed set of configuration settings at some interval, such as every 15 minutes, every hour, every day, etc. As an example, the management server 110 may increase the cache size allocation of one server and decrease the cache size allocation of another server. The further operations discussed in FIG. 1A show how these varied configuration settings are then tested and used.

In the illustrated example, the management server 110 determines configuration settings 124 for the first server environment 122A, configuration settings 134 for the second server environment 132A, and configuration settings 144 for the third server environment 142A. The management server 110 stores these configuration settings in its data storage 112 as, or as part of, the configuration settings 114.

The sets of configuration settings 124, 134, and 144 may include settings such as network settings, a cache size, a working data size, an allocation of memory, thresholds, limits for concurrency of operations, limits on user subscriptions, and so on. For example, the configuration settings 124, 134, and/or 144 may include a maximum wait time, a maximum execution time, a maximum number of rows of data that can be returned, a maximum number of rows of data that can be retrieved, memory consumption limits, file size limits, etc. As another example, the configuration settings 124, 134, and/or 144 may include a limit to the number of concurrent operations for a given user and/or project, a limit to the number of interactive operations that can be processed at a time, e.g. for a given project, a limit to the number of scheduled operations that can be processed at a time, e.g. for a given project, etc. As another example, the configuration settings 124, 134, and/or 144 may include a limit to the number of users or user connections, e.g. for a particular project, a limit to the number of concurrent connections that a user can have, etc. As another example, the configuration settings 124, 134, and/or 144 may include a limit to the number of execution requests that a user can subscribe to, a limit to the number of cache updates that a user can subscribe to, a limit to the number of email subscriptions that a user can subscribe to, a limit to the number of files that a user can subscribe to, a limit to the number of personal views that can be created, e.g. by URL sharing, a limit to the number of reports and/or documents that a user can subscribe to, e.g., to be delivered to an FTP (File Transfer Protocol) location at a time, to be delivered to a printer at a time, or to be delivered to a mobile device at a time, etc. As another example, the configuration settings 124, 134, and/or 144 may include a maximum file size that can be imported, e.g. for use as a data source, a maximum size of data cubes, e.g. for each individual, a permission to allow users to import files, e.g. from the Internet using a URL, using an HTTP or HTTPS URL, or using an FTP server, permission to allow users to import data from files on a particular server, etc.

A group or combination of settings represents a configuration to be tested. Because the management server 110 can test combinations of configuration settings across many different server environments and can then normalize the results to account for differences in factors such as hardware and load, not all combinations of settings need to be tested on all server environments. Testing a combination on one server environment provides a high-confidence indication of how that combination of settings will affect the performance of other server environments.

In some implementations, in determining configuration settings 124, 134, and 144 for each of the server environments 122, 132, 142, the management server 110 uses default configuration settings. These default configuration settings may be based on the resources available to each of the server environments 122, 132, 142 (e.g., the resources limitations of the first server 120, the second server 130, or cloud computing system 140). These default configuration settings may be based on the amount of load that each of the server environments 122, 132, 142 typically experiences or is expected to experience. In these implementations, determining configuration settings for each of the server environments 122, 132, 142 may involve the management server 110 modifying the default configuration settings. In modifying the default configuration settings, the management server 110 may use a machine-learning model, such as the one described above.

In some implementations, in determining configuration settings 124, 134, and 144 for each of the server environments 122, 132, 142, the management server 110 may use existing configuration settings for each of the server environments 122, 132, 142. These existing configuration settings may exist in data storage 112 as part of configuration settings 114 and may have been previously, manually entered by an administrator (e.g., administrator 150 as shown in FIG. 1B). In these implementations, determining configuration settings for each of the server environments 122, 132, 142 may involve the management server 110 accessing the data storage 112 to obtain the configuration settings 114. In these implementations, determining configuration settings for each of the server environments 122, 132, 142 may involve the management server 110 modifying the existing configuration settings. In modifying the existing configuration settings, the management server 110 may use a machine-learning model, such as the one described above.

The changes to configuration settings that the management server 110 instructs may be bounded by certain rules or thresholds. For example, thresholds may dictate a minimum or maximum value for each of the settings of the configuration settings for a particular server environment. The thresholds may be set to limit the amount (e.g., percentage) by which a value of a default or existing setting can be changed. For example, for one setting, a maximum threshold may be set to 300% of baseline value for the setting and a minimum threshold may be set to 33% of the baseline value. This can limit to a reasonable the range in which the management server 110 can to varying the setting and exploring values to within a reasonable range set to allow for proper operation. Each different setting or parameter can have its own corresponding range or limits. The application of bounds or ranges that limit setting variations can be particularly important when the management server 110 is experimenting with automatically derived settings changes for production servers, e.g., server environments that are relied on by users. Other controls can also be used by the management server 110, such as limiting the magnitude of individual changes. For example, even if a setting change is known to improve efficiency, it can be carried out in by the management server 110 incrementally over a series of interactions. For example, rather than doubling a cache size allocation from 10 GB to 20 GB, the management server 110 may instruct the cache size to be increased by 2 GB each day for five days. As a result, the management server 110 can monitor performance for each of the intermediate cache sizes (e.g., 12 GB, 14 GB, 16 GB, etc.) and verify that performance is increasing or at least has not decreased. If there are unexpected negative effects of the incremental changes, the management server 110 can detect these and discontinue further changes and/or reverse the changes already made.

In some implementations, ranges and thresholds are used to set limits for settings values are used to set configuration settings for production server environments but not all environments evaluated by the management server 110. To test more extreme variations in settings and to test larger numbers of combinations of settings without impacting users, the management server 110 may create alternative versions of server environments. The management server may do this by creating a replica or test-only environment as a copy of a production server environment. The replica environment, running on separate hardware resources and insulated from user access, may be provided simulated user requests and run tasks for testing. As a result, negative effects of a certain setting change, such as instability, errors, or increased delays, would not be experienced by users, but would still be detected and characterized by the management server 110. The replica environments can be configured with settings values within a broader range than those that limit settings for production environments, or the management server 110 may be unconstrained when specifying the settings values for replica environments.

The management server 110 determines configuration settings 124, 134, and 144 for each of the server environments 122, 132, 142 and stores the determined configuration settings in its data storage 112, illustrated as configuration settings 114. The management server 110 also sends out the determined configuration settings 124, 134, and 144 to each of the server environments 122, 132, 142 respectively. The sets of configuration settings 124, 134, and 144 are different in the example, showing that different combinations of settings are tested. Of course, configuration settings may be the same for multiple server environments, especially once combinations of settings that provide high performance have been identified by the management server 110.

In some implementations, the first server environment 122A and/or the second server environment 132A are production server environments. Production server environments are server environments that are in use. As such, when the management server 110 sends configuration settings to these one or more server environments, users may be impacted by the resulting effects of those changes. The management server 110 when usage is relatively low, such as in the evening, to limit impact on users.

At stage (B), the management server 110 monitors the performance of each of the server environments 122, 132, 142 with their respective sets of configuration settings 124, 134, and 144. The management server 110 may monitor the performance of each of the server environments 122, 132, 142 for a specific time period and store the results, as shown by stored performance results 116. This time period may be predetermined (e.g., 1 hour, 6 hours, 12 hours, 1 day, etc.). This time period may be entered or selected by an administrator (e.g., administrator 150 as shown in FIG. 1B) and may be variable.

The management server 110 associates performance results it detects with the particular set of configuration settings that produced those results. For example, the performance results for server environment 122 are associated with the set of configuration settings 124 labeled "C1" so it is clear which combination of settings produced those results.

To make sure that each of the server environments 122, 132, 142 each run comparable tasks for testing purposes, the management server 110 can issue a common set of tasks to each of the server environments 122, 132, 142. For example, the management server 110 can instruct each of the server environments 122, 132, 142 to generate the same document or process the same query with respect to a shared test data set. The tasks that are assigned by the management server 110 for testing purposes can be provided intermittently among regular requests from users. The tasks from the management server 110 may simulate user requests and may appear to the server environments 122, 132, 142 to be user requests. The management server 110 may instruct the testing tasks to be performed at multiple times to generate multiple data points about the capabilities of the server environments 122, 132, 142.

When testing the server environments 122, 132, 142, the management server 110 tracks any of various aspects of performance. Examples include response time, the average response time, task completion time, average task completion time, whether errors occurred, whether results are accurate, and so on. Other events and parameters can be detected to show the conditions occurring when the performance results were achieved. In other words, various information about the context for interpreting performance results can be acquired, such as load levels experienced during testing (e.g., number of users currently supported, number of tasks run concurrently, CPU usage, memory usage, etc.), hardware resources accessible by the environment (e.g., number of processors, clock speed or type of processors, amount of memory available, etc.), and so on.

As an example, the management server 110 may receive telemetry data from each of the server environments 122, 132, 142 that indicates events and the times they occurred. The performance results, such as start times and completion times for testing tasks, are linked to the load levels and other conditions experienced at those times.

As another example, the management server 110 also tracks hardware resource configuration and utilization for the server environments 122, 132, 142 during the testing process. The hardware resources may include the number of CPUs used, the types and frequency of the CPU's used, and/or the amount of memory (e.g., RAM) used. The management server 110 may associate the performance results of a particular combination of configuration settings with the hardware resources used during the testing. Because parameters such as resource utilization levels change over time, each performance test can be associated with the corresponding parameters present at the time of the test.

At stage (C), the management server 110 determines a relative performance measure, such as a relative performance index RPI, for each of the configuration settings 124, 134, and 144 tested. This information is illustrated RPI data 118. The RPI value indicates the level of performance when a particular combination of configuration settings is used, after the influence of the hardware resources and/or the load levels of a particular server environment have been removed or reduced.

In order to remove the influences and determine the RPI, the management server 110 may normalize the performance results (e.g., all or part of performance results 116) for the hardware resources used by the server environments 122, 132, 142 during the testing process, and/or normalize the load levels on the server environments 122, 132, 142 during the testing process.

Normalizing the performance results may involve scaling the performance results based on differences in load level and/or differences in hardware resources. This process can boost or penalize results to estimate how the server environments would have performed if they had the same hardware resources available and experienced the same load levels. As a very simple example, performance could be normalized to the equivalent of a 50% load level. For a task that scales linearly with load capacity, the scaling factor could be 1+(50−X)/100, where "X" represents the load level percentage. As a result, if a first server environment had a load level of 80% at the time of testing, a 1.0 second task completion time may be scaled from 1.0 seconds to 1.0*(1−30/100)=0.7 seconds. Similarly, a second server environment that had a load level of 30% at the time of testing and also achieved a 1.0 second task completion time may be scaled from 1.0 seconds to 1.0*(1+20/100)=1.2 seconds. Differing hardware capabilities can also be taken into account with scaling factors. The scaling used during the normalization of the performance results may be linear or non-linear. In some implementations, the scaling or the RPI score itself is determined by a machine-learning model that has learned from examples, previous performance results, and/or previous configuration settings.

In some implementations, the RPI is determined for overall performance. That is, the RPI might account for the response time(s), the task completion time(s), the concurrency, the frequency of errors, the type of errors, and the accuracy of results. However, each of these performance aspects are not necessarily weighted the same when determining the RPI. In some implementations, multiple RPI scores may be calculated for different aspects of performance e.g., with one RPI score being a normalized indication of response time, another RPI score representing a normalized indication of accuracy, etc.

In actual implementations, the techniques for normalizing the performance results and generating RPI values can be defined or learned empirically. Different tasks or portions of tasks are sensitive to different factors, e.g., memory size, memory latency, CPU speed, number of concurrent tasks, and so on, and there may be non-linear or unpredictable relationships of these factors on performance. The management server 110 can run the tasks used for testing in different, controlled conditions to characterize the effects of different hardware changes and load levels on performance. This can enable the management server 110 to characterize how different conditions affect performance. In other words, the management server 110 can operate a server environment and with the same software configuration settings, run a suite of tests with the environment experiencing 0% load, then 5% load, then 10% load, then 15% load and so on. Similarly, the management server 110 can operate a server environment with the same software configuration settings and different hardware resources, e.g., different numbers of processors, different types of processors, different memory sizes, and so on. By testing different combinations of load levels and hardware resources while keeping software settings and other factors constant, the management server 110 can isolate the effects of (and interplay of) load level and hardware resources, to develop the data points that show how change in load and hardware affect performance. Of course, the characterization of effects of load and hardware on performance can be done for each of various different combinations of configuration settings, so that the particularities of one combination of configuration settings do not skew the relationships that will be used for normalizing results. With the load/hardware characterization data points, the management server 110 can extract the relationships needed to normalize for changes in load and hardware. This can be done thorough any appropriate technique, such as regression modelling, curve fitting, or machine learning.

As an example, the management server 110 can use the data points that characterize the performance of a single software configuration over different load and hardware conditions to train machine learning models. For example, a machine learning model can be trained to receive input indicating actual performance measured for a test, load statistics during the test, and hardware used by the tested environment, and output an RPI. The parameters of the machine learning model can be trained so that substantially the same RPI is produced for a single test and software configuration, even for different absolute performance results achieved due to different load and hardware conditions. By training models in this way, the models can learn the complex interaction between different types of tasks with load levels and hardware resource availability, and perform a normalization that takes them into account.

The testing process may include testing the server environments, e.g. the server environments 122, 132, and 142, with a specific set of operations and/or with one or more files, records, data collections, or data cubes. In some implementations, the management server 110 takes into account the complexity of the set of operations and/or the complexity, e.g. size or type, of the files, records, data collections, or data cubes that are used during the testing process for a particular server environment. The complexity may be calculated, for example, based on the types of queries that are being performed during testing, the number of derived attributes and their complexity, as well as the volume of data that would be returned. This complexity may be used by the management server 110 in calculating the RPI for the particular environment.

In FIG. 1A, a table 104 depicts information for each combination of configuration settings tested, e.g., C1, C2, and C3. The table 104 shows the conditions 105 present when the testing occurred, e.g., hardware resources used and/or allocated to the server environments, such as the number of CPUs and the amount of RAM, as well as load levels. The table 104 also shows the measured results 106, which in the illustrated example are average response times for the tests. The server environment conditions 105 and the performance results 106 to generate RPI values 107 for the respective combinations of configuration settings.

In the example, the first server environment 122A was allocated 6 CPUs and 64 GB of RAM. In testing and monitoring the first server environment 122A, the management server 110 measured a load level of 80% and a response time of 1.2 s. Based on the load level, the hardware resources, and the performance results of the first server environment 122A, the management server 110 determines that configuration settings 124 of the first server environment 122A had an overall RPI of 69.

The second server environment 132A was allocated 10 CPUs and 128 GB of RAM. Of the three server environments, the second server environment 132A was allocated the most hardware resources. In testing and monitoring the second server environment 132A, the management server 110 measured a load level of 60% and a response time of 1.5 s. Based on the load level, the hardware resources, and the performance results of the second server environment 132A, the management server 110 determined that configuration settings 134 of the second server environment 132A had an overall RPI of 62.

The third server environment 142A was allocated 4 CPUs and 32 GB of RAM. Of the three server environments, the third server environment 142A was allocated the least hardware resources. In testing and monitoring the third server environment 142A, the management server 110 measured a load level of 99% and a response time of 3.3 s. Based on the load level, the hardware resources, and the performance results of the third server environment 142A, the management server 110 determines that configuration settings 144 of the third server environment 142A had an overall RPI of 78.

As shown in table 104 and indicated by the determined RPIs, when taking into account the limited hardware resources and/or the high load level of the third server environment 142A, the third server environment 142A with configuration settings 144 performed the most efficiently despite having the worst performance results (e.g., having the highest response time of 3.3 s). In other words, when taking into account the high load and low hardware resources used, the combination of settings C3 is identified as providing very good performance.

At stage (D), the management server 110 uses the RPIs 107 to identify combinations of configuration settings that provide the highest performance. For example, the management server 110 uses the RPIs 107 to select the configuration settings associated with the highest overall RPI. The management server 110 can then use the identified combination of settings that provides the highest performance to improve the performance of one or more of the server environments.

In the illustrated example, the set of configuration settings 144 "C3" is associated with the highest RPI value, which indicates the highest relative performance. Therefore, the management server 110 selects the third configuration settings 144 as providing the highest performance. The management server 110 can use this set of configuration settings 114 in various ways. For example, the management server 110 can provide a recommendation to an administrator of a server environment to change to the settings in the set of configuration settings 144 "C3." As another example, the management server 110 can automatically distribute and apply the set of configuration settings 144 "C3" to other server environments to improve their performance. This can be done in a single update, or through a series of incremental settings updates that are spaced apart in time, in order to gradually reach the settings indicated in the set of configuration settings 144 "C3."

Referring now to FIG. 1B, in stage (E), the management server 110 sends a recommendation to a client device 152 of an administrator 150 for the server environments 122 and 132. In response to the recommendation, or when called up by user input, the client device 152 shows the recommended settings on a user interface of the client device 152. The user interface 154 can include controls for acting on the recommendation, such as to accept or reject the changes suggested. In addition, the user interface 154 can show performance improvements that are expected due to the change in configuration, such as an amount (e.g., percentage) increase in capacity, an amount of decrease in response time, and so on.

The client device 152 may be a computing device, such as a laptop, a desktop computer, a mobile computing device, etc. The client device 152 is able to communicate with the management server through, for example, a network. Here the user interface 154 is a graphical user interface (GUI). In other implementations, an administrator may be provided the recommendation through other interfaces, such as an audible output through a speaker, with the client device 152 having a microphone to detect a verbal response from the administrator 150.

Through the user interface 154, the administrator 150 may be provided a list of settings of configuration settings 144 and their respective values. The client device 152 may receive configuration settings 144 from the management server 110 after it has select configuration settings 144 in stage (D). The administrator 150 may be presented a "Yes" button 156 and a "No" button 158. The administrator 150 may also be presented a list 160 of server environments (e.g., server environments 122 and 132) that the configuration settings 144 should be provided to. The list 160 may be provided by the management server 110 (e.g., may be a list of server environments not currently using configuration settings 144), may be manually entered by the administrator 150, or may be selected by the administrator 150 from, for example, a list of all server environments (or all server environments not currently using configuration settings 144).

If the administrator 150 selects the button 156, a response is sent to the management server 110 confirming that configuration settings 144 should be provided to the server environments in the list 160 (e.g., server environments 122 and 132). The management server 110 then carries out the changes. If the administrator 150 selects the button 158, the management server 110 will not apply the changes, but the administrator may still manually modify the settings if desired. Optionally, settings modifications may be phased in gradually over several increments, or in a single event. In some implementations, the user interface enables the administrator 150 to make modifications to the configuration settings 144, and then select the button 156 to cause management server 110 to apply the modified version of the configuration settings 144.

As shown in FIG. 1B, the administrator 150 selects the button 156, therefore choosing to apply the configuration settings 144 to server environments 122 and 132. A response is sent from the client device 152 to the management server 110 confirming that the configuration settings 144 should be provided to the first server environment 122 and the second server environment 132 as indicated in the list 160.

In some implementations, the management server 110 automatically applies configuration settings to one or more server environments and selects the one or more server environments to receive the configuration settings. In these implementations, the management server 110 does not need any manual input from an administrator (e.g., administrator 150) to make the changes. In fact, coupled with the ability to make and monitor the effects of incremental changes, the management server 110 can automatically vary the settings of server environments on an ongoing basis to evolve the settings to provide high performance as workloads change and needs change over time.

At stage (F), the management server 110 provides the servers 120 and 130 the configuration settings 144 and instructs them to apply the configuration settings 144 for the first server environment 122 and the second server environment 132. The management server 110 does not need to provide the cloud computing system 140 the third configuration settings 144 because the third server environment 142 is already using those configuration settings.

The management server 110 continues performing the operations discussed for stages (B) to (F). For example, the management server 110 monitors the performance of the server environments 122 and 132 with the configuration settings 144 as described above with respect to stage (B) of FIG. 1A, and may continue to a assess performance and adjust settings in further performance enhancement cycles.

In some implementations, the management server 110 provides the servers 120 and 130 a modified version of the third configuration settings 144. The management server 110 may do this by making minor changes to the existing configuration settings of a particular environment, waiting a period of time, and repeating the process. The management server 110 may use a machine-learning model to determine these iterative changes. This iterative process may be helpful when there are significant differences between the existing configuration settings of a server environment and the third configuration setting 144 and/or configuration changes are limited by one or more thresholds. This iterative process may be helpful when the server environment is a production environment since significant changes in the server environment's configuration settings could negatively impact users in some instances.

Figure 2:
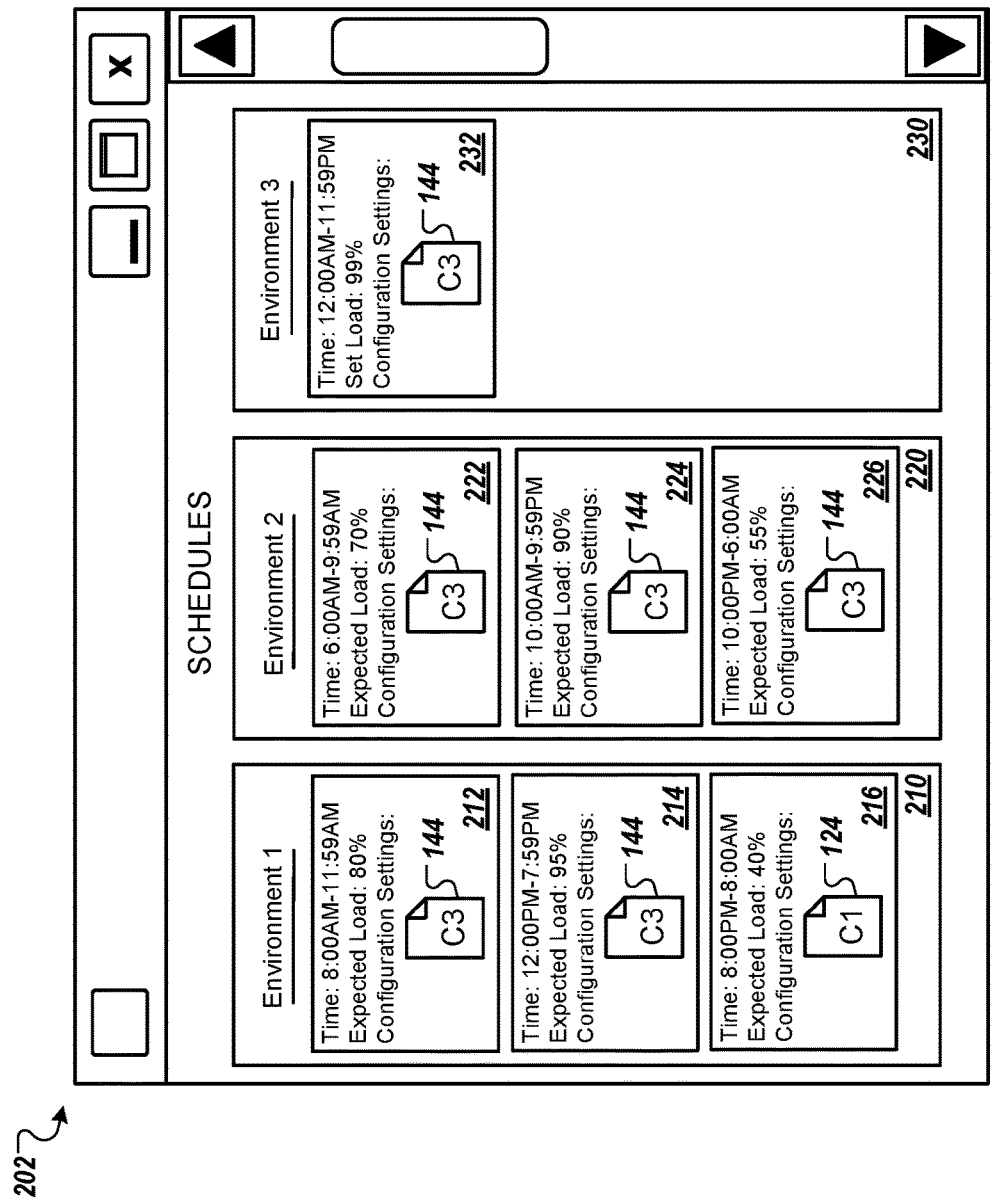
FIG. 2 is a diagram that illustrates example configuration schedules for multiple computing environments.

FIG. 2 shows a diagram that illustrates an interface 202 displaying configuration schedules 210, 220, and 230 for three different server environments. The interface 202 and the configuration schedules 210, 220, and 230 may be created by the management server 110 (as shown in FIGS. 1A-1B) and provided to an administrator device (e.g., administrator device 152 as shown in FIG. 1B) for display to and/or modification by an administrator (e.g., administrator 150 as shown in FIG. 1B).

The interface 202 includes a configuration schedule 210 for a first server environment (e.g., first server environment 122 as shown in FIGS. 1A-16). The interface 202 includes a configuration schedule 220 for a second server environment (e.g., second server environment 132 as shown in FIGS. 1A-1B). The interface 202 includes a configuration schedule 230 for a third server environment (e.g., third server environment 142 as shown in FIGS. 1A-1B).

Each of the schedules 210, 220, and 230 may include one or more time periods (e.g., time periods 212, 214, and 216 for configuration schedule 210) and a selected configuration settings for the particular server environment during those time periods.

In some implementations, the specific time periods for each server environment may be selected or entered by an administrator (e.g., administrator 150 as shown in FIG. 1B) through an administrator device (e.g., administrator device 152 as shown in FIG. 1B).

In some implementations, the specific time periods are selected by the management server 110 as shown in FIGS. 1A-1B. In these implementations, the management server 110 may determine time periods based on the variance in load level on the server environment throughout the day. The variance in load level needed to create a new time period may be preset (e.g., above 5%, 10%, 15%, 20%, 30%, etc.). The management server 110 may take an iterative process to determining these time periods. For example, the management server 110 may first determine that, for the first server environment, between the times of 8:00 AM and 7:59 PM the load level for the first server environment typically deviates 20%, then determine that between the times of 8:00 AM and 12:59 PM the load level typically deviates 7%, and finally that between the times of 8:00 AM and 11:59 AM the load level only typically deviates 4%. In this example, due to the deviation for the time period between 8:00 AM and 11:59 AM being at or below variance (e.g., 5%), the management server 110 creates the time period 212. In determining time periods, the management server 110 may use a machine-learning model. Determining time periods with little variance in load level may be important as a server environment with a particular set of configuration settings may perform significantly worse when a load level deviates from what is expected.

The configuration schedule 210 for the first server environment has three time periods, a first time period 212, a second time period 214, and a third time period 216. The first time period 212 has an expected load level of 80% and is associated with the third configuration settings 144 as shown in FIGS. 1A-1B. That is, during this first time period 212, the first server environment will use the third configuration settings 144. The second time period 214 has an expected load level of 95% and is also associated with the third configuration settings 144. The third time period 216 has an expected load level of 40% and is associated with the first configuration settings 124 as shown in FIG. 1A. Here, although the management server 110 as shown in FIGS. 1A-1B selected the third configuration settings 144 due to having the best RPI, subsequent testing may have revealed that in low load level scenarios (e.g., at or below 50%), the first configuration settings 124 produced the best overall RPI.

The configuration schedule 220 for the second server environment has three time periods, a first time period 222, a second time period 224, and a third time period 226. The first time period 222 has an expected load level of 70% and is associated with the third configuration settings 144 as shown in FIGS. 1A-1B. The second time period 224 has an expected load level of 90% and is also associated with the third configuration settings 144. The third time period 226 has an expected load level of 55% and is also associated with the third configuration settings 144. Here, unlike with the first server environment, the third configuration settings 144 are ideal for the second server environment for all time periods.

The configuration schedule 230 for the third server environment has a single period 232. The time period 232 has a load level of 99% and is associated with the third configuration settings 144 as shown in FIGS. 1A-1B. The load level may be a set load level (e.g., set by the management server 110 as shown in FIGS. 1A-1B or an administrator) when the third server environment is a replica or test-only environment that is created for testing. Due to having a set load level, there is no variation in the load level on the third server environment and only a single time period is needed and/or created. Here, the management server 110 or an administrator (e.g., administrator 150 as shown in FIG. 1B) may create additional time periods with different load levels to test. In addition, the management server 110 or an administrator may adjust the time period to a limited window that represents that time of day when the virtual server is actually scheduled to be tested.

Figure 3:
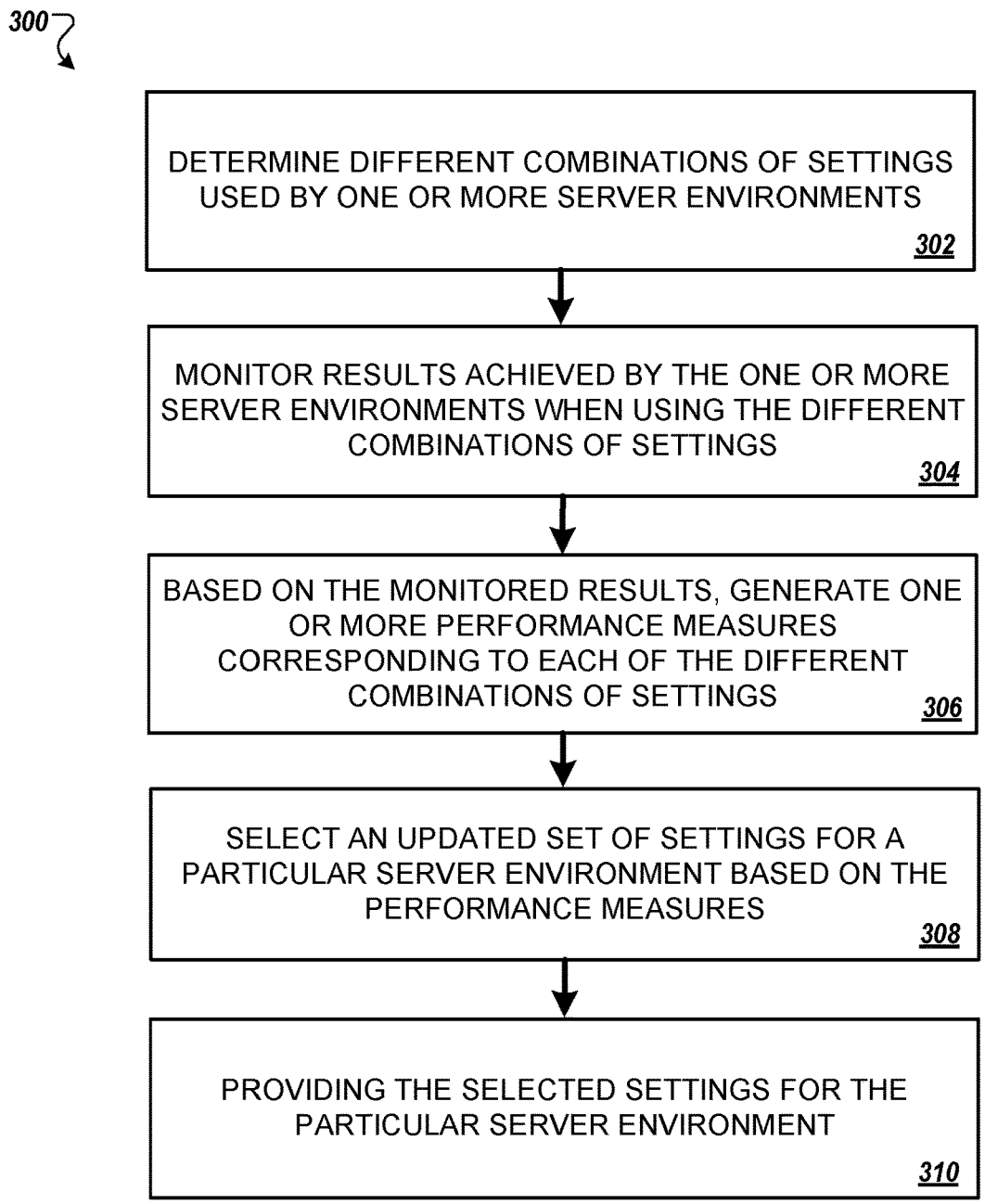
FIG. 3 is a flow diagram showing an example process for optimizing computing environments.

FIG. 3 is an example process 300 for optimizing computing environments. The process 300 can be performed, at least in part, using the system 100 described herein.

The process 300 for optimizing computing environment may be an automated process performed be one or more computing devices, e.g., without user instructions other user-specified input. For example, with respect to FIGS. 1A-1B, the operations corresponding to flow of data of stages (A)-(F) may be automatically performed by the management server 110 in that the management server 110, e.g., without input or instructions from the administrator 150, performs various operations to select the configuration settings 144, and/or provides the configuration settings 144 to the server environments 122 and 132 to replace existing configuration settings.

The process 300 includes determining different combinations of settings used by one or more server environments (302). For example, there may be different computer systems, such as different servers and/or cloud computing systems, that have been instructed to use different settings. The different settings may arise naturally and independently through the changes and instructions of different systems administrators, software upgrades, and so on. In addition, or as an alternative, a management system may instruct and coordinate different combinations of settings to be used at different server environments in order to then measure the resulting effects on performance.

Determining different combinations of settings can include identifying settings that are currently used by the one or more server environments, or settings that were previously used by the one or more server environments. For example, with respect to FIGS. 1A-1B, the management server 110 can identify the configuration settings currently (or previously) used by the server environments 122, 132, and 142. An indication of the configuration settings used by the different server environments 122, 132, and 142 may be stored on the management server, e.g., as part of the configuration settings 114. The management server 110 may, therefore, use the configuration settings 114 to identify the configuration settings used by the different server environments 122, 132, and 142.

For example, determining different combinations of settings can include requesting the settings currently or previously used by the one or more server environments from, for example, the one or more corresponding servers. For example, with respect to FIGS. 1A-1B, the management server 110 can request from the server 120 the configuration settings 124 used by the server environment 122 hosted by the server 120.

Determining different combinations of settings can additionally or alternatively include obtaining the settings currently or previously used by the one or more server environments. For example, with respect to FIGS. 1A-1B, the management server 110 may receive from the server 120 the configuration settings 124 or data indicating the configuration settings 124 in response to requesting the current configuration settings used by the server environment 122.

Determining different combinations of settings can include extracting from data received from a server or other computing system the configuration settings used in a server environment hosted by the server or other computing system. For example, with respect to FIGS. 1A-1B, the management system 110 may receive a data package from the server 120 that includes configuration settings 124. The management server 110 may proceed to extract the contents of the data package, e.g., by decrypting the data package, to obtain the configuration settings 124.

The combination of settings may include settings from one or more categories of settings. Specific categories of settings may include resource allocation settings, network configuration settings, resource allocation settings, network configuration settings, etc. For example, resource allocation settings may include settings for memory allocation (e.g., amount of RAM allocated to a particular server environment) and/or CPU assignment settings (e.g., number of CPUs allocated to a particular server environment), etc. As another example, the network configuration settings may include request timeout settings (e.g., a maximum response time until the request is automatically ended and an error is returned), concurrency settings (e.g., maximum number of requests that can be processed simultaneously by a server environment), maximum instance settings (e.g., that specify the maximum number of container instances in a server environment to limit scaling in response to incoming network requests), port settings, etc. Other settings include cache settings (e.g., size of cache, maximum age of cache, enabling or disabling cache, verification of resources prior to using cache, etc.). Settings for an environment can also include information about the software running, such as: which modules, packages, libraries, or other software elements are installed; which software elements are running; which versions of the software elements are present; etc.

The process 300 includes monitoring, by the one or more computers, results achieved by the one or more server environments when using the different combinations of settings (304). Monitoring results achieved by the one or more server environments may include requesting (e.g., periodically, periodically over a particular time period, in response to certain conditions being met such as a minimum number of requests being received at a server environment, etc.) and/or receiving results corresponding to a particular server environment from a server or other computing system that hosts the server environment. For example, with respect to FIGS. 1A-1B, the management server 110 may monitor the server environments 122, 132, and 142 over a time period of one week by requesting performance results every two minutes during the one week time period. The management server 110 may store the received performance results as the performance results 116.

The results may include information describing aspects of performance such as throughput (e.g., capacity), accuracy, error, power efficiency, and/or latency. For example, results relating to throughput may include a log of transactions between client(s) and a server environment, documents delivered by server environment to the client(s), times when the documents were requested by the client(s), times when the documents were delivered by the client(s), etc. As another example, results relating to accuracy may include the documents requested or an indication of the documents requested, and the corresponding documents delivered or indications of the documents delivered. Results relating to error tracking may include, for example, a log of errors that have occurred, indications of the errors that have occurred, a log of requests that contains requests that resulted in an error, etc. As another example, result relating to power efficiency may include a log of the CPU utilization for and/or number of CPUs used by a server environment over time, a log of a corresponding number of requests being processed, a log of a corresponding number of documents being delivered, etc. Additionally, results relating to the latency may include, for example, times when requests from client(s) are received at a server environment, and the corresponding response times (e.g., when data transfer begins).

In some implementations, with respect to FIGS. 1A-1B, the administrator 150 may indicate to the management server 110 which types of results to provide. In response, the management server 110 may monitor the specified types of results and avoid monitoring (e.g., requesting and receiving) unnecessary results from the server environments 122, 132, and 142. For example, the administrator 150 may indicate that the goal for a set of settings is to maximize latency and throughput. Accordingly, the management server 110 may determine that results falling into the power efficiency category do not need to be monitored.

The process 300 includes, based on the monitored results, generating one or more performance measures corresponding to the respective different combinations of settings (306). The system can evaluate each combination of server settings with respect to different aspects of performance, to determine which combinations of settings provide the best performance in different contexts or settings. For example, one set of settings may provide high throughput but low power efficiency. Another set of settings may provide low latency but only moderate throughput. Different combinations of settings thus have different performance profiles or performance results and may be better suited for different situations. For example, one set of settings might result in performance characteristics that are ideal for a database server but less ideal for a web server or application server. Similarly, some settings may result in high performance under certain infrastructure or hardware configurations but not in other situations. The performance measures allow the system to characterize how different settings or combinations of settings impact performance, so the system can better compare the impacts of the settings and select which settings would lead to performance improvements for one or more server environments.

Generating performance measures corresponding to each of the different combinations of settings may include generating performance measures using the monitored results. The performance measures may include, for example, maximum latency, average latency, maximum throughput (e.g., capacity), average throughput, performance efficiency, power efficiency, maximum error rate, average error rate, maximum percent accuracy, average percent accuracy, etc.

The performance measures may observed performance measures and relative performance measures. The observed performance measures may include, for example, calculating or otherwise determining actual performance metrics corresponding to a server environment configured with a particular set of settings from the results corresponding to the server environment and the set of settings. For example, with respect to FIGS. 1A-1B, the management server 110 may calculate the latency for each of the server environments 122, 132, and 142 that use the configuration settings 124, 134, and 144 respectively. The management server 110 may use the performance results 106, e.g., the response times, to calculate the latency. The relative performance measures may include, for example, normalized performance measures and a relative performance index (RPI). The management server 110 may calculate the normalized performance measures by normalizing the observed performance measures using the conditions of the server environments when monitoring occurred, e.g., as indicated by the respective set of settings of each server environment. For example, with respect to FIGS. 1A-1B, the conditions 105 present when the monitoring occurred may include hardware resources used and/or allocated to the server environments (e.g., such as the number of CPUs and the amount of RAM), concurrency settings for the server environments, cache settings for the server environments, etc.

The RPI may be calculated (e.g., by the management server 110) for each set of setting using the normalized performance measures. For example, the management server 110 may average the normalized performance measures to calculate the RPI. Alternatively, the management server 110 may apply a weight (e.g., between 0 and 1) to each of the normalized performance measures to obtain weighted performance measures. The management server 110 may proceed to average the weighted performance measures for each set of settings to obtain the RPI corresponding to each set of settings. The weight applied to each of the normalized performance measures may be determined based on administrator preferences. For example, the administrator 150 may indicate that the goal for a set of settings is to maximize latency and throughput. Accordingly, the management server 110 may apply a low weight (e.g., a weight of 0) to performance measures that are not relevant to this goal. For example, the management server 110 may apply a weight to performance efficiency and/or to power efficiency performance measures. Similarly, the management server 110 may use this information (e.g., previously provided by the administrator 150, such as before the start of the process 300) to determine that a higher weight should be applied to latency and throughput performance measures than error rate and percent accuracy performance measures.

The process 300 includes selecting an updated set of settings for a particular server environment based on the performance measures (308). In general, the system seeks to identify a combination of settings that is expected, based on the monitored performance measures, to improve the performance of a server environment. For example, the particular server environment may have an average response latency of 0.5 seconds, and the system can identify a combination of settings that has provided lower average response latency while maintaining other performance aspects (e.g., software compatibility, throughput, etc.), so the update does not decrease overall performance. The relative importance of different performance aspects may be different for different types of server environments (e.g., web servers, application servers, database servers, etc.) and/or for different types of workloads. Accordingly, the system can take this into account and select, from among the various sets of settings that have been monitored in use, a set of settings that improves the performance aspects that are relevant to the use, workload, or role of the server environment. Accordingly, not all server environments may be provided the same updated set of settings. The system may select, for use in database servers, a first set of configuration settings that provides a high transaction rate or high data transfer rate. The system may select, for use in web servers, a different set of settings that provides low latency and high concurrency of connections. Thus, the system can select a set of settings that is appropriate for the typical patterns and type of work of a server environment, and which improves the aspects of performance that are relevant to the server environment.

The criteria for selecting the updated set of settings may include, for example, a minimum RPI (e.g., applying a threshold RPI), ranking the sets of settings according to RPI (e.g., and selecting the set of settings with the highest RPI if other conditions are met), minimum performance measure values other than RPI (e.g., minimum observed or normalized performance measures that may be predetermined by an administrator), predetermined criteria (e.g., provided by an administrator), and/or limitations of the server environment.

As an example, with respect to FIGS. 1A-1B, the management server 110 may determine that the RPI for first set of configuration settings is 0.81, the RPI for a second set of configuration settings is 0.81, and the RPI for a third set of configuration settings is 0.70. Based on this, the management server 110 may eliminate the third set of configuration settings from further consideration and/or may suspend further consideration of the third set of configuration settings. In selecting between the first set of configuration settings and the second set of configuration settings, the management server 110 may compare both sets of configuration settings to predetermined criteria provided by the administrator 150, such as a minimum latency, a minimum throughput, a maximum error rate, a minimum percent accuracy, etc. In selecting between the first set of configuration settings and the second set of configuration settings, the management server 110 may determine if both sets of configuration settings are compatible with the receiving server environment. As an example, the management server 110 may determine that both sets of settings meet the predetermined criteria, but the second set of configuration settings is not compatible with the receiving server environment due to the host of the receiving server environment not having sufficient processing capabilities to allocate to the server environment as required by the second set of configuration settings. Accordingly, the management server 110 may select the first set of configuration settings for the particular server environment.

The process 300 includes providing the selected settings for the particular server environment (310). This may include sending the selected settings directly to the particular server environment, e.g., with instructions to apply the selected settings on the particular server environment. The instructions may specify for the particular server environment to replace its current settings with the selected settings. In this manner, the system can automatically optimize different server environments by selecting updated sets of settings for them and transmitting the updated sets of settings. In some cases, these may be incremental, iterative changes to settings as the system detects new combinations of settings that improve performance in different circumstances or workloads.

The selected settings may be provided to a management system or a client device of an administrator for the particular server environment for review or approval before changes to the settings are made. For example, the selected settings in a manner that causes a client device to request authorization from an administrator before the selected settings can be implemented on the server environment. For example, with respect to FIGS. 1A-1B, the management server 110 may send the configuration settings 144 to the server 120 for use by the server environment 122. However, the management server 110 may also provide an indication that authorization by a system administrator is required prior to reconfiguration the server environment 122. Once a system administrator has authorized the reconfiguration of the server environment 122 to use the configuration settings 144, the prior configuration settings 124 will be replaced with the configuration settings 144.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   determining, by the one or more computers, different combinations of settings used by one or more server environments;
   tracking, by the one or more computers, load levels and amounts of resources allocated to the one or more server environments;
   monitoring, by the one or more computers, results achieved by the one or more server environments when using the different combinations of settings, wherein the monitored results include at least one of throughput, task completion times, or response times;
   based on the monitored results, generating, by the one or more computers, a performance measure for each of the different combinations of settings, wherein the performance measure for each combination of settings is based on the throughput, task completion times, or response times achieved using the combination of settings, and wherein the performance measures are normalized to account for differences in the tracked load levels and amounts of resources allocated when the throughput, task completion times, or response times were achieved using the respective combinations of settings;
   ranking, by the one or more computers, the different combinations of settings based on the performance measures that are normalized to account for differences in the tracked load levels and amounts of resources allocated and that respectively correspond to the different combinations of settings;
   selecting, by the one or more computers, an updated set of settings for a particular server environment, wherein the updated set of settings is selected from the different combinations of settings based on the ranking of the different combinations of settings; and
   providing, by the one or more computers, the updated set of settings that was selected for the particular server environment.

2. The method of claim 1, wherein determining different combinations of settings used by one or more server environments comprises determining, for each of multiple server environments, a combination of settings used by the server environment.

3. The method of claim 1, wherein the one or more server environments comprise multiple server environments, and wherein the method further comprises:
   determining hardware resources allocated to the multiple server environments when results are monitored; and
   determining load levels present at the multiple server environments when the results are monitored;

wherein generating the performance measure for each of the different combinations of settings comprises generating, for each of the different combinations of settings, a relative performance measure that is based on (i) results achieved by a server environment using the combination of settings, (ii) the hardware resources allocated to the server environment when the results were achieved, and (iii) the load levels present at the server environment when the results were achieved, wherein the relative performance measures are generated to each indicate performance that would be achieved using a same reference level of load and a same level of resource allocation; and wherein ranking the different combinations of settings based on the performance measures comprises ranking the different combinations of settings based on the relative performance measures that indicate performance that would be achieved using a same reference level of load and a same level of resource allocation.

4. The method of claim 1, comprising initiating, by the one or more computers, a set of tasks for each of the one or more server environments, wherein monitoring, by the one or more computers, the results achieved by the one or more server environments when using the different combinations of settings comprises monitoring, for each of the one or more server environments, completion times for tasks in the set of tasks.

5. The method of claim 1, wherein providing the updated set of settings for the particular server environment comprises initiating a change for the particular server environment to use the updated set of settings.

6. The method of claim 1, comprising periodically changing the settings for the particular server environment on an ongoing basis as additional performance measures are generated.

7. The method of claim 1, comprising making a series of multiple incremental changes to a configuration setting of the particular server environment, each of the incremental changes moving the configuration setting closer to a corresponding setting in the updated set of settings.

8. The method of claim 1, comprising repeatedly performing, by the one or more server environments, a predetermined set of tasks, wherein monitoring the results achieved by the one or more server environments comprises monitoring completion times for the set of tasks.

9. The method of claim 1, comprising:

generating a copy of the particular server environment of the one or more server environments; and testing the copy of the particular server environment when using multiple combinations of settings, wherein determining the different combinations of settings used by the one or more server environments comprises determining multiple combinations of settings for the particular server environment, and wherein monitoring the results achieved by the one or more server environments comprises monitoring performance of the copy of the server environment when using the multiple combinations of settings when performing a predetermined set of tasks.

10. The method of claim 1, wherein the settings comprise one or more of caching settings, concurrency settings, or memory allocation settings.

11. The method of claim 1, wherein monitoring the results achieved comprises monitoring completion times for generating or serving a predetermined set of multiple documents.

12. The method of claim 1, wherein monitoring the results achieved comprises monitoring speed to process tests configured to appear as user requests to the one or more server environment.

13. The method of claim 1, wherein generating a performance measure for each of the different combinations of settings comprises:

scaling performance levels indicated by the monitored results for different computer systems to obtain performance measures that represent levels of performance standardized to a consistent level of load and/or hardware resources.

14. The method of claim 1, wherein:

the particular server environment is configured to use a first set of configuration settings; and the updated set of settings is one of the different combinations of settings that is configured to provide higher performance than the first set of configuration settings.

15. The method of claim 1, wherein:

the particular server environment is configured to use a first set of settings that corresponds to a first performance measure; and the updated set of settings is one of the different combinations of settings and has a corresponding performance measure that indicates higher performance than the first performance measure.

16. The method of claim 1, wherein:

the particular server environment is configured to use a first set of settings;

the updated set of settings is one of the different combinations of settings; and the updated set of settings is selected based on the ranking indicating that the updated set of settings provides higher performance than the first set of settings.

17. A system comprising:

one or more computers; and one or more computer-readable media storing instructions that, when executed by the one or more computers, cause the one or more computers to perform operations comprising:

determining, by the one or more computers, different combinations of settings used by one or more server environments;

tracking, by the one or more computers, load levels and amounts of resources allocated to the one or more server environments;

monitoring, by the one or more computers, results achieved by the one or more server environments when using the different combinations of settings, wherein the monitored results include at least one of throughput, task completion times, or response times;

based on the monitored results, generating, by the one or more computers, a performance measure for each of the different combinations of settings, wherein the performance measure for each combination of settings is based on the throughput, task completion times, or response times achieved using the combination of settings, and wherein the performance measures are normalized to account for differences in the tracked load levels and amounts of resources allocated when the throughput, task completion times, or response times were achieved using the respective combinations of settings;

ranking, by the one or more computers, the different combinations of settings based on the performance measures that are normalized to account for differences in the tracked load levels and amounts of resources allocated and that respectively correspond to the different combinations of settings;

selecting, by the one or more computers, an updated set of settings for a particular server environment, wherein the updated set of settings is selected from the different combinations of settings based on the ranking of the different combinations of settings; and providing, by the one or more computers, the updated set of settings that was selected for the particular server environment.

18. The system of claim 17, wherein determining different combinations of settings used by one or more server environments comprises determining, for each of multiple server environments, a combination of settings used by the server environment.

19. One or more computer-readable media storing instructions that, when executed by one or more computers, cause the one or more computers to perform operations comprising:

determining, by the one or more computers, different combinations of settings used by one or more server environments;

tracking, by the one or more computers, load levels and amounts of resources allocated to the one or more server environments;

monitoring, by the one or more computers, results achieved by the one or more server environments when using the different combinations of settings, wherein the monitored results include at least one of throughput, task completion times, or response times;

based on the monitored results, generating, by the one or more computers, a performance measure for each of the different combinations of settings, wherein the performance measure for each combination of settings is based on the throughput, task completion times, or response times achieved using the combination of settings, and wherein the performance measures are normalized to account for differences in the tracked load levels and amounts of resources allocated when the throughput, task completion times, or response times were achieved using the respective combinations of settings;

ranking, by the one or more computers, the different combinations of settings based on the performance measures that are normalized to account for differences in the tracked load levels and amounts of resources allocated and that respectively correspond to the different combinations of settings;

selecting, by the one or more computers, an updated set of settings for a particular server environment, wherein the updated set of settings is selected from the different combinations of settings based on the ranking of the different combinations of settings; and providing, by the one or more computers, the updated set of settings that was selected for the particular server environment.

* * * * *